United States Patent [19]

Reynolds et al.

[11] Patent Number: 5,452,350

[45] Date of Patent: Sep. 19, 1995

[54] SUBSCRIBER CALL ROUTING PROCESSING SYSTEM

[75] Inventors: Henry S. Reynolds, Glendale Heights; Edward F. Bonkowski, Wheaton; Joel D. Dalsky, Hoffman Estates; Dean R. Pannell, St. Charles; Joyce J. Schmidt, Schaumburg, all of Ill.

[73] Assignee: Advantis, Schaumburg, Ill.

[21] Appl. No.: 848,247

[22] Filed: Mar. 9, 1992

[51] Int. Cl.$^6$ .................. H04M 7/00; H04M 15/00; H04Q 3/64

[52] U.S. Cl. ............................ 379/220; 379/113; 379/115; 379/127; 379/134; 379/230; 379/265; 379/309

[58] Field of Search ............... 379/112, 113, 114, 115, 379/201, 207, 230, 265, 266, 309, 127, 134, 210, 220, 221, 196, 197, 198, 229, 234, 242, 243, 244

[56] References Cited

U.S. PATENT DOCUMENTS

| | | | |
|---|---|---|---|
| 3,111,561 | 11/1963 | Dunning | 379/67 |
| 3,542,961 | 11/1970 | Klein et al. | 379/211 |
| 4,048,452 | 9/1977 | Oehring et al. | 379/113 |
| 4,191,860 | 3/1980 | Weber | 379/115 |
| 4,400,587 | 8/1983 | Taylor et al. | 379/113 |
| 4,510,351 | 4/1985 | Costello et al. | 379/112 X |
| 4,611,094 | 9/1986 | Asmuth et al. | 379/201 |
| 4,669,113 | 5/1987 | Ash et al. | 379/221 |
| 4,670,899 | 6/1987 | Brody et al. | 379/60 |
| 4,737,983 | 4/1988 | Frauenthal et al. | 379/265 X |
| 4,757,267 | 7/1988 | Riskin | 379/201 X |
| 4,769,834 | 9/1988 | Billinger et al. | 379/196 X |
| 4,788,718 | 11/1988 | McNabb et al. | 379/266 |
| 4,908,850 | 3/1990 | Masson et al. | 379/88 |
| 4,953,204 | 8/1990 | Cuschleg, Jr. et al. | 379/266 |
| 4,974,256 | 11/1990 | Cyr et al. | 379/113 |
| 5,095,505 | 3/1992 | Finucane et al. | 379/127 X |
| 5,291,550 | 3/1994 | Levy et al. | 379/265 |

Primary Examiner—James L. Dwyer
Assistant Examiner—Harry S. Hong
Attorney, Agent, or Firm—Wood, Phillips, VanSanten, Clark & Mortimer

[57] ABSTRACT

A method is described for routing calls outside of a carriers network based on characteristics of the call, the attributes of the caller, the status of subscriber-provided resource, and the status of network telephone provided facilities. Information about the call and the caller's identification is sent from the public switched telephone network to a subscriber call routing processor. The carrier is directed by the routing processor to route the call to the subscriber's resource best able to handle the call. Information about the call and the business relationship the caller has with the subscriber is used by the routing processor to determine which type of resource is needed to handle the call. The routing processor then chooses the particular resource of that type to which the call is to be routed based on the current status of the resource, the status of the network-provided facilities, and the criteria established by the subscriber for selecting between alternative resources. Resource types may include any PSTN terminations, including automatic call distributors, audio response units, modems, and individual stations. The routing processor may also send information to the carrier to be delivered to the subscriber resource to assist in handling the call.

21 Claims, 6 Drawing Sheets

SUBSCRIBER CALL ROUTING PROCESSING SYSTEM

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates to the field of telephony and, more particularly, to a system where calls are routed using intelligence resident outside of the public switched telephone network.

2. Background of the Invention

A telephone system, in its most basic form, comprises one individual dialing a telephone number assigned to another individual. With such a system, there is a one-to-one relationship between the dialed number and the destination. The telephone system is also designed to provide special calling services using inbound N00 telephone numbers. These numbers currently utilize the area codes 800 or 900. Particularly, businesses arrange for the use of a particular 800 number to allow customers, at no cost, to call and transact business. Conversely, with a 900 number, the customer is charged for the service.

During the early 1980's, the long distance carriers removed 800 number translation and routing from switching systems and instead placed it in a call routing database, referred to as a "service control point" (SCP). This architectural implementation allowed a single nationwide N00 number to be routed to any one of a plurality of subscriber destinations. For example, a caller may wish to place an order with a company, inquire about the status of an account, or obtain information about the company's products or services. The SCP must be configured to make the determination as to which of the destinations should receive a particular call, i.e. where the call should be routed. The general type of subscriber service desired may be selected by dialing a particular number, with different numbers corresponding to different services. Alternatively, the subscriber may have a single number and utilize prompting whereby additional digits are entered by the caller to specify the particular service desired. All of this information is used by the SCP to make the routing decision.

In response to a call routing inquiry from a carrier switch node, the SCP makes the routing decision based on some combination of specified criteria, namely, originating area code and/or exchange, time of day, day of week, date, and any caller entered digits. These call characteristics are compared to call screening criteria resident in the SCP in the form of a "routing tree" to determine the destination to which the call should be routed. The call routing response results in the call either being routed to a specific location or allocated among a set of locations using preselected percentages. The subscriber may change the call screening procedure and call allocation percentages by inputting these changes to the SCP in the form of a new or revised routing tree. These changes become effective sometime after they are made depending upon the particular system used. These changes can be used to cope with unexpected variations in customer calling volume, the lack of available agents at one or more subscriber destinations and other factors. However, this is a rather slow response to a dynamically changing system.

In managing how calls are routed among several alternate subscriber destinations, caller identity, the carrier network, the SCP, and subscribers resources are all used. The subscriber strives to satisfy various performance criteria. One of extreme importance is how long it takes for a call to be answered by an agent. If the time is too long, then the perception of quality drops. If callers are held in queue, then carrier charges may increase. Finally, an abandoned call can adversely effect revenue in a sales application if a customer does not call back.

One solution is to provide a sufficient number of agents to handle the maximum number of calls expected. However, this is an economically impractical solution. An optimal solution is to utilize a minimum number of agents while routing the calls to satisfy specified performance objectives.

The present invention is intended to solve one or more of the problems discussed above in a novel and simple manner.

SUMMARY OF THE INVENTION

In accordance with the invention, there is disclosed a subscriber call routing processing system which makes routing decisions outside of the public switch telephone network.

It is one object of the invention to provide call routing decisions based on specific identity of the caller. A caller ID, comprising all ten digits of the phone where the call is originating, can be stored in a database along with information about the caller relevant to the business relationship the caller has with the subscriber. Along with influencing call routing instructions, some of this information can be provided to the carrier network for delivery to the destination which receives the call. This information can be used by the resource to assist in handling the customer.

Additionally, this feature allows information collected and stored about a particular customer to influence a call routing decision. The customer database, for instance, can be configured to keep track of how many calls are made from a particular customer during given periods of time. This information can be used to route the call in a specific way, such as by transferring calls to different resources depending on the number made.

In accordance with another aspect of the invention, calls can be routed based on the availability of agents or other resources for handling the calls. Calls can be load balanced across multiple subscriber resources at the same or different locations to minimize queuing and maximize resource productivity. Based on screening performed on call characteristics and caller attributes, several subscriber resources may be able to handle the call. Additional criteria provided by the subscriber specifies how to choose from among these alternate resources. This criteria includes precedence level information used to rank the alternate resources and performance information used to determine the maximum time callers are allowed to wait in queue for each resource at each destination.

In accordance with yet another aspect of the invention, subscriber provided call routing allows the status of network provided facilities to influence a call routing process. An operational support system in the carrier's network provides alarm data about the switches and facilities used to connect customer calls to the subscriber's resources. Depending on the availability of the carrier's switches and facilities, some of the subscriber's resources may not be able to receive all of the calls they are capable of handling. Calls routed to a subscriber resource in excess of the network's ability to handle calls results in the caller experiencing a fast busy tone or intercept announcement. Network availability information is used in the load balance process to provide an improved call routing decision.

In accordance with a further aspect of the invention, the call screening criteria and routing instructions can be changed dynamically. The manner in which decision algorithms are organized permits changes to be made to dynamic variables within a matter of seconds. Also, a subscriber is able to respond to problems either in the public switched telephone network or subscriber network very quickly and minimize the impact on lost sales and customer service.

In accordance with still another aspect of the invention, subscriber provided call routing allows many different dialed numbers that share the same destinations to be routed by the same routing rule. By doing so, any dynamic changes made by the subscriber become effective immediately and simultaneously for all dialed numbers routed by the same routing rule. Thus, load balancing is able to incorporate all of the calling demand being placed on the resources, and simultaneously load balance calls for all of the dialed numbers.

In accordance with yet a further aspect of the invention, subscriber provided call routing allows call routing queries to originate in more than one carrier network for the same routing rule. The different dialed numbers that share the same resources may be transported over different carrier networks. Calls for the same dialed number may also be transported over more than one carrier network and delivered to the same subscriber resource. Each carrier's own routing tree can only make routing decisions that are independent of those made in other carrier networks. These routing decisions cannot provide a system offering the benefits of subscriber provided call routing using routing intelligence resident in a single point outside of the carrier's network to provide an effective dynamic updating and load balancing system involving multiple carrier networks.

More particularly, there is disclosed herein an advanced intelligent network comprising a routing processor, activity monitor, event processor, and caller database. The routing processor uses algorithms, in the form of routing rules that select the business user's preferences, for delivering N00 calls to a proper destination. The event processor receives status information on resources and relays that information to the activity monitor for both route processing and call center operation monitoring. The activity monitor controls the flow of information and uses that information in conjunction with routing algorithms to determine the variable information within the routing rules used by the routing processor that selects the final destination. The caller database provides information about the caller to choose the preferred destination for the call. Such information also may be sent to the destination to assist the agent in handling the call.

The process flows through the subscriber network as by a call inquiry exiting the telephone network SCP looking for a destination. The routing processor fills in the destination and returns a call routing response based on the routing rule initially created by the subscriber and dynamically updated by the activity monitor. The call is routed, via the public switched telephone network, to the desired resource and status information is passed back through the event processor to the activity monitor to assist in subsequent routing decisions and to provide agent statistics information.

Further features and advantages of the invention will be readily apparent from the specification and from the drawing.

DETAILED DESCRIPTION OF THE DRAWING

Figure 1:
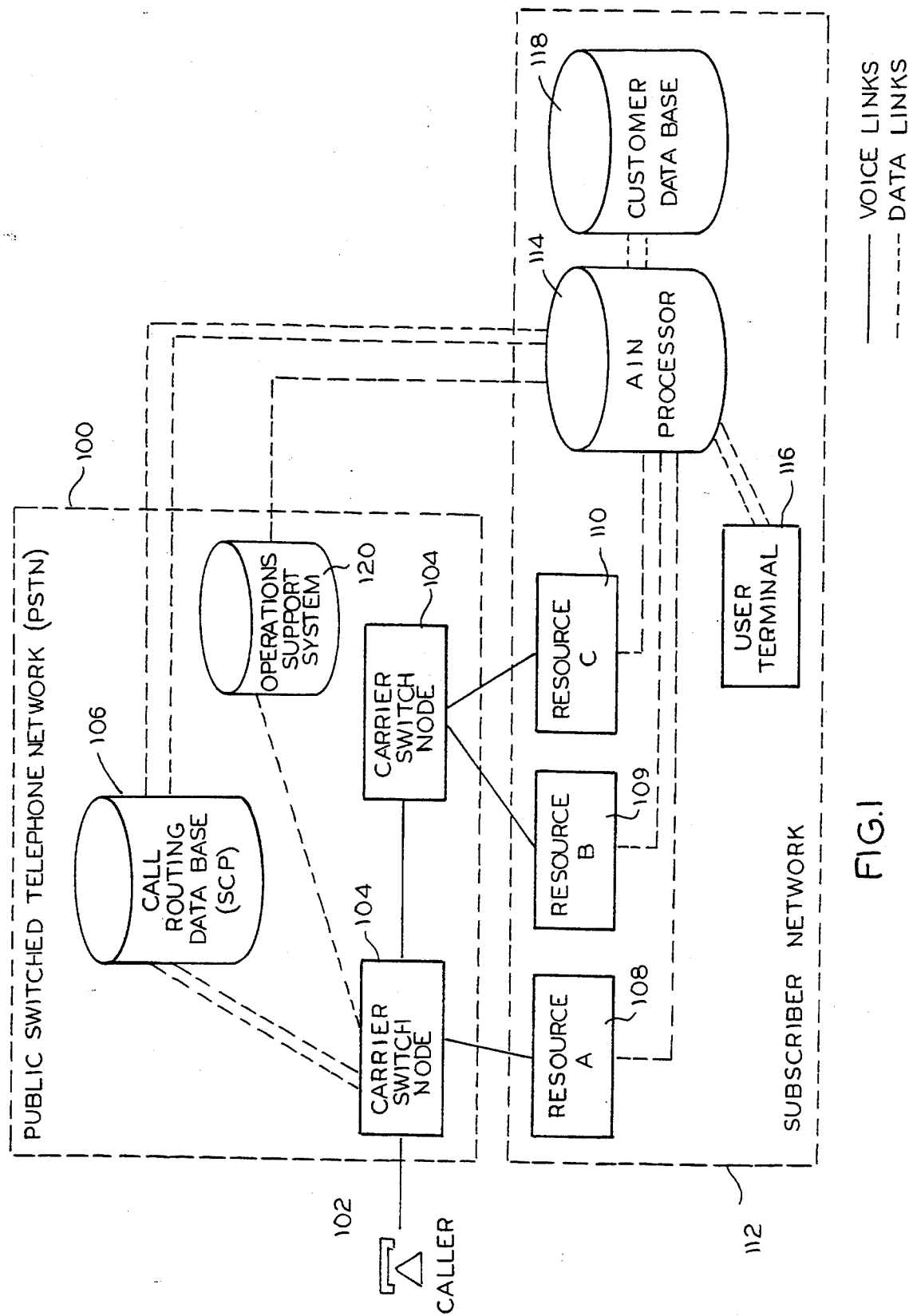
FIG. 1 is a diagrammatic/block diagram illustrating basic elements in the public switched telephone network and the subscriber network in accordance with the invention.

With reference to FIG. 1, a diagrammatic/block diagram illustrates a subscriber call routing processing system used in accordance with the invention. The system is designed to allow a subscriber the ability to control routing of inbound N00 (currently area codes 800 or 900) telephone calls to a desired destination or resource based on the subscriber supplied routing criteria. This embodiment of the invention uses area codes 800 and 900 but can easily be extended to support any inbound service and any numbering plan.

The system utilizes the facilities of the public switched telephone network (PSTN) 100 provided by one or more network carriers. These carriers include, for example, Sprint, MCI, AT&T and any local exchange carrier. A caller originates a call at a telephone 102 by dialing a number assigned to the particular subscriber. The call is connected to one of many carrier switch nodes 104 contained in the PSTN 100. The particular carrier switch node 104 is generally that in closest proximity to the caller 102. The carrier switch node 104 temporarily suspends the call setup process owing to the receipt of an N00 number and launches a routing query to the carrier's call routing database or service control point (SCP) 106. Based on the number dialed, a call translation process is invoked in the SCP 106 using routing trees configured for the subscriber. Within a subscriber network 112, there are included a plurality of resources, identified as Resources A, B and C, 108, 109 and 110, respectively, to which the calls should ultimately be routed. Conventionally the routing decision is made by the routing tree at the SCP 106. The SCP 106 controls switching in the carrier switch nodes 104 to connect the caller 102 to one of the resources 108–110. One example of such a conventional system is disclosed in Frauenthal et al., U.S. Pat. No. 4,737,983.

In accordance with the invention, the subscriber network 112 also includes an advanced intelligent network (AIN) processor 114, a user terminal 116 and a customer database 118 for making routing decisions outside of the PSTN 100. The SCP 106 is modified so that instead of directly implementing decisions from its own routing tree, it launches a routing query to the AIN processor 114 in the subscriber network 112. Based on the information provided by the carrier within the routing query, information about the caller contained in the subscriber's customer database 118, information provided by the carrier's operation support system 120 about the status of the facilities, and information about the status of the resources 108–110 which may handle the call, the AIN processor 114 returns a resource identifier to the SCP 106. This response may also include data to be delivered to the resource by the PSTN 100. The SCP 106 receives the routing response from the AIN processor 114 and instructs the carrier switch node 104 to resume the call setup process and complete the call through the PSTN 100 to the designated subscriber resource 108, 109 or 110.

Routing queries from different callers for the same dialed number may simultaneously originate in more than one carrier network, based on the needs of the subscriber and the capabilities of each carrier. The subscriber interfaces with the AIN processor 114 through the user terminal 116.

Figure 2:
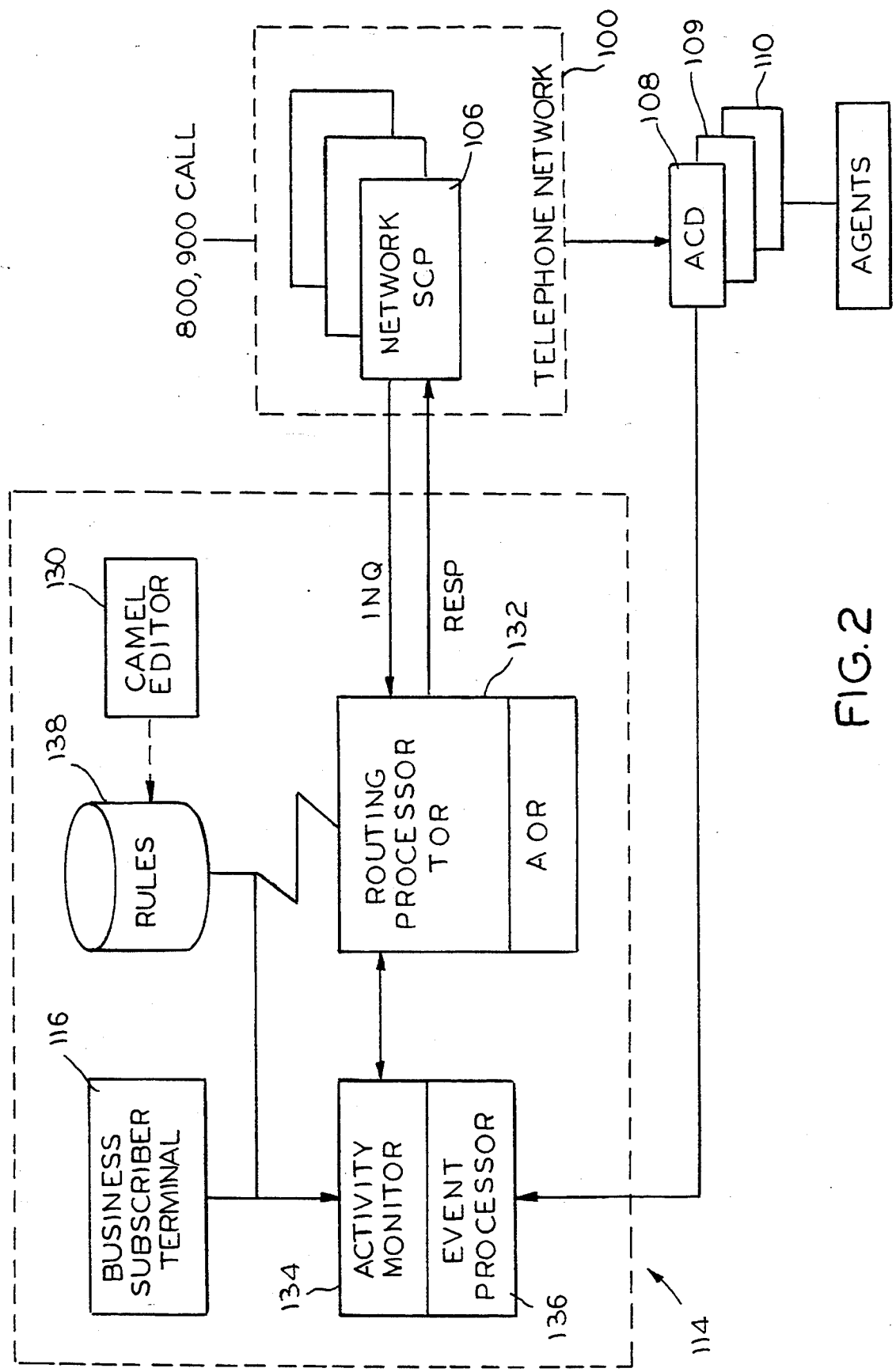
FIG. 2 is a more detailed block diagram illustrating the elements of the advanced intelligent network processor of FIG. 1 and its relationship with the public switched telephone network.

With reference to FIG. 2, the components of the AIN processor 114 are illustrated in greater detail. Particularly, the AIN processor 114 consists of a Call Management Language (CAMEL) editor 130, a routing processor 132, an activity monitor 134, an event processor 136 and the end user terminal 116. The CAMEL editor 130 allows the subscriber to create routing rules, stored in a DASD 138, which contain a majority of the routing decisions that affect the delivery of a call to the subscriber's resources. The routing processor 132 uses the completed routing rules to deliver N00 calls to the proper resource. The event processor 136 receives information from the resources, such as ACD's, 108–110, to be used for both route processing and call center operations monitoring. The activity monitor 134 controls the flow of information in the AIN processor 114 and uses that information in conjunction with the routing rule structures to determine the variable information within the routing rules used by the routing processor 132 to select the final destination.

The plot process through the advanced intelligent network processor 114 begins when a call routing query exits the PSTN SCP 106 looking for a destination. The routing processor 132 fills in the destination using the routing rules and returns a call routing response based on the routing rule initially created by the subscriber and dynamically updated by the activity monitor 134. The call is routed, via the PSTN, to the desired ACD 108–110 and status information is passed back through the event processor 136 to the activity monitor 134 to assist in the next routing decision and to provide agents statistics information.

In accordance with the invention, the CAMEL editor 130, routing processor 132, activity monitor 134 and event processor 136 may comprise separate processing systems connected via a suitable network, or may be part of a single processing system. Advantageously, the functions are implemented in a Customer Information Control System (CICS). A CICS is a program operating in a processing system enabling transactions entered at remote terminals to be processed concurrently by subscriber application programs. The various functions consist of either regions within the system, or tasks forming part of a particular region.

The SCP 106 is part of the public switched telephone network 100 and is not itself part of the invention. Nevertheless, the subscriber network 112 must communicate with the SCP 106 to permit routing decisions to be made externally of the PSTN 100. A new node type similar to existing allocation, time and NPA nodes is defined for the N00 system in the SCP 106. This node allows the subscriber to interact with the SCP via a communication interface to make real time routing decisions based on subscriber defined algorithms described in the subscriber network 112. If a valid response is not obtained on the communication interface, then a default decision is made by the routing tree in the SCP 106.

Within the SCP 106 the new node type is processed exactly as the existing time, NPA and allocation nodes until it is accessed for call processing. When accessed for call processing in the SCP 106 the line identification field in the node is compared with an SCP configuration database for the selection of the session and physical communication line to be used. If that session is in accessible status for an open with no unresolved errors, then the SCP 106 transmits an inquiry message on that session. If a response to the inquiry is received within a short timeout (nominally 500 milliseconds) which matches a selection on the node, then processing continues with that selection. Otherwise, processing continues with the default selection defined within the SCP 106.

In order to assure rapid response, high speed point-to-point lines are used. Inquiries are transmitted as calls are processed without waiting for a response to previous inquiries. Volumes of up to forty inquiries per second are supported in a single session. Thus, up to twenty inquiries may be outstanding at any one time. Application timeout is measured from transmission of the inquiry to receipt of response to that inquiry. Both sides of the interface perform automatic error recovery when possible consistent with minimizing response time and code complexity. In order to minimize the impact on call processing performance, the SCP 106 maintains its status indication on each session and only attempts to send inquiries on a session with verified status.

The SCP 106 generates an inquiry message when a communication node is encountered in processing a call. Each inquiry message will contain:
1. Inquiry ID;
2. NPA-NXX-XXXX (or as many digits as available);
3. N00 Number;
4. Node Identifier;
5. Caller information (such as class of service); and
6. Caller entered digits.

The subscriber network 112 generates a response message in response to an inquiry. The inquiry ID will be from the inquiry message received. Each response will contain:
1. Inquiry ID;
2. Select Code;
3. Destination tag; and
4. Caller information.

When the session is established, initialization messages are exchanged identifying the communication node processed by node identifier.

"NPA-NXX-XXXX" designates the area code, exchange and station of the caller. "N00 number" identifies the number dialed by the caller. "Node identifier" specifies a character string identifying a particular usage of the communication feature known to both the SCP 106 and the AIN processor 114. The "Select code" and "Destination tag" identify a particular routing choice. These are also known to both the SCP 106 and the AIN processor 114.

Activity Monitor

The activity monitor 134 is the central control point for all subscriber network processing. This processing includes: polling of status information from resources; reporting of agents status information; implementation of user-defined routing rules; use of algorithms to create tables necessary to provide load balancing and other features; facilities to accept manual input from an end user terminal to effect routing of calls; facility to report and respond to an outage in the subscriber network 112; facility to accept routing statistics from the routing processor 132; facility to obtain caller specific information from the caller database 118 and to collect and store information about the caller; and facility to log the routing statistics for trend analysis, billing and agent planning.

The subscriber resources can include automatic call distributors (ACD's), audio response units (ARU's) and other intelligent peripheral (IP) devices, agents working out of their own homes, network message announcement devices, or any other PSTN termination. The activity monitor 134 uses status information from these resources, application programs and subscriber input to calculate capacity percentages used to route calls to available resources over the next thirty second period of time. This information is also used in the reporting of statistics or resource availability for the previous thirty second period of time.

The ACD resource may comprise any commercially available ACD. In the embodiment illustrated and described herein, the system is used in connection with a Rockwell Galaxy ACD. The polled Rockwell ACD information format, specifically known as Call Side Real Time Gate and Overflow records, is found in a Rockwell International manual titled "Galaxy ACD, External Record Description—Galaxy 7", pages 1–5. Also, information on the RMC foreign processor data link request format can be found in the Rockwell International manual titled "Galaxy ACD RMC Foreign Processor Data Link", pages 1–13. The specific reporting fields provided are agents available, number of abandoned calls, average delay in queue, average speed of answer, primary agent call work time, cumulative calls offered, number of calls held, number of calls offered, number of out calls, percent calls held, primary positions manned, secondary positions manned and service level.

While the processing of routing rule creation and processing is initiated by the subscriber through the CAMEL editor 130, the implementation of these routing rules involves messages between the activity monitor 134 and the affected routing processor 132. For new rules, this involves sending a message to the routing processor 132 to a terminal owning region (TOR) to retrieve a routing rule from the file. The TOR forwards the message to the appropriate application owning region (AOR) for processing. The routing processor's AOR region accesses the routing rule from the rule object file and places the rule in the AOR's rule data table. The routing processor notifies the activity monitor 134 through the TOR that the rule has been installed in the AOR's data table. Upon receipt of all notifications from all routing processors 132, the activity monitor 134 instructs the routing processor 132 to update their active rule tables in memory and on any DASD's 138. For scheduled requests, the activity monitor 134 coordinates the sending of the initial retrieve message. Included are messages to include new rules from each routing processor 132. For existing rules, the same procedures as above apply. Existing rules are retrieved from the common rule file at the activity monitor 134.

The routing algorithm uses call volume information from the routing processors 132 and resource status information from ACD's, ARU's, or other customer premise equipment and agents at home to create proper call routing destination tables to be in effect for the next thirty second period of time. The activity monitor 134, every thirty seconds, initiates the request for information from the above mentioned resources via the event processor 136 and waits a period of time to receive responses to that request. All information received is time stamped to indicate its age. If any resource does not respond within two cycles, then that resource is flagged as inactive and the resource is placed into manual operation mode. It remains in manual operation mode until there is a successful poll. Under normal processing, the select process creates tables and sends them to the routing processor 132 for use in call distribution.

Upon creation of the routing rules, an outcome table is generated from CAMEL SELECT statements, as described below, which describes destinations and preferences to which the calls can be routed. The routing algorithm uses this information to determine the final outcome of the call. This table resides in the activity monitor 134 and can be updated, if necessary, when a new routing rule is implemented. This depends solely upon if the new rule contains a new routing outcome or uses a previously defined routing outcome.

The specific format of the routing rules is discussed in greater detail below relative to the CAMEL editor 130. The use of the routing algorithm for generating the outcome table is also described below after sufficient background has been provided so that it is more readily understandable.

Event Processor

The principal activity of the event processor 136 is to collect statistical information from the various resources, namely, ACD's, ARU's, other CPE's, application programs and manual input. Once collected, the information is available for reporting on any user terminal 116.

With respect to ACD's, the event processor includes a direct link to read information directly into the activity monitor 134. Indeed, in one implementation, the event processor 136 comprises a task in the region used for the activity monitor 134. The event processor 136 uses an appropriate protocol data link and polls the ACD's every processing cycle to receive the above-discussed information.

With ACD's other than the Rockwell Galaxy ACD, a mini-computer can be used at the ACD site connected to a supervisory serial interface of the same to request status information as necessary. The mini-computer is configured to emulate the supervisory terminal and isolates the event processor from the ACD. It also functions as a protocol converter for the ACD supervisory serial interface to the Advanced Intelligent Network protocol.

Call Management Language (CAMEL) Editor

The CAMEL editor 130 is used principally for the creation of routing rules. This includes listing routing rules in a CAMEL data set, entry and maintenance of CAMEL data set members, compiling translation of routing rules into codes acceptable for use by routing processors 132 and activity monitors 134, and error identification, presentation and correction of CAMEL statements. The CAMEL editor uses a Call Management Language (thus the name CAMEL). Particularly, the subscriber using the CAMEL language creates routing rules to make routing decisions used for routing calls to a selected resource. A specification of the Call Management Language used is provided in the appendix hereto. Reference may be had to this specification for an understanding as to the details of the language for creating routing rules.

Figure 3:
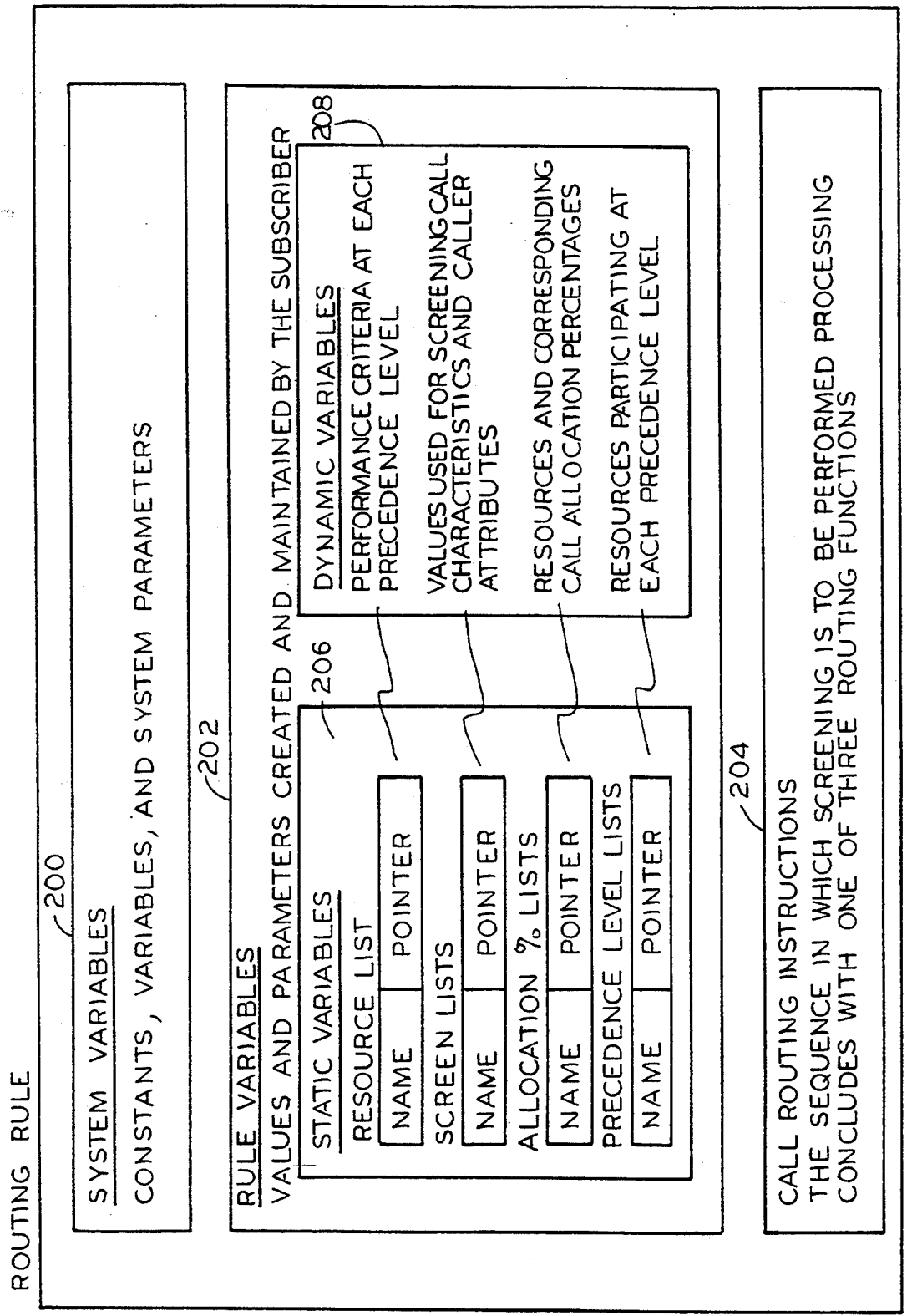
FIG. 3 is a table illustrating the general configuration for a routing rule.

The format for a completed routing rule is illustrated in FIG. 3. The routing rule contains all of the information and instructions for responding to the routing inquiry initiated by the SCP 106, see FIG. 1. The routing rule contains three types of information, including system variables 200, rule variables 202 and call routing instructions 204.

The System variables 200 include constants, variables and system parameters which are created and maintained automatically by the AIN processor 114, see FIG. 1. These include system dates, system time, system day and other various input/output areas for communicating with other network elements.

The rule variables 202 comprise values and parameters specified by the subscriber and used as criteria against which to screen call characteristics and caller attributes, and used to allocate or load balance calls among resources. The rule variables 202 include static variables 206 and dynamic variables 208. The static variables 206 are specified at the time the rule is created and cannot be changed unless a new rule is created to replace an existing one. The static variables 206 consist of a name and a pointer to a list of values. Only the name and pointer address are static. The values in the list are the dynamic variables 208. For example, there is a static variable 206 for each resource to which a call can be routed, the dynamic variables 208 corresponding to the performance criteria that apply to each precedence level.

There is a static variable 206 for each call screening criteria, the list values being NPA's, NPA-NXX's, days of the week, dates, time ranges, caller entered digits, etc. There is a static variable 206 for each allocation table. The list contains resources and their corresponding call allocation percentages. There is a static variable 206 for each routing outcome. The list values contain the resources that participate at each precedence level. The dynamic variables 208 can be changed by the subscriber in real time without the need for creating, validating, and activating a new rule. These changes take place within seconds of the time they are requested by the subscriber.

The call routing instructions 204 specify the sequence in which the call characteristics and caller attributes are compared to the various call screening criteria. Based on one or more successful matches between the values of the call being routed and the values in the call screening criteria, one of three routing functions is performed. The three types of routing functions available are ROUTE, ALLOCATE and SELECT. The ROUTE function directs the call to a single specified destination. The ALLOCATE function routes the call based on the contents of an allocation table comprising a list of destinations with specific percentages assigned. The SELECT function uses load balancing based on the contents of a routing outcome, precedence level, and performance criteria.

A routing outcome comprises a hierarchy of resource groups that define preferred routing to the load balancing process. In so doing, the load balancing algorithm attempts to route as many calls to destinations in the most preferred resource group as possible. If sufficient call handling capacity is not available at a given level of precedence, then calls are routed to the resource group at the next level of precedence. An example of a SELECT function might contain in the first precedence level a single destination that is geographically close to the caller to minimize expenses. The second precedence level could define a short list of destinations whose applications are all serviced out of the same data processing center to minimize application inquiry response times. The third precedence level could define all of the possible destinations to enable the largest degree of agent availability.

The following is an example of a typical routing rule:

```
ACD TELECAT    = 'SAN_ANTONIO',    "Telecatalogue Resource"
                 'GREENSBORO',      "Table"
                 'WICHITA',
                 'FT_WAYNE',
                 'MOBILE';
IP ARUSITES    = 'KCKSARU',         "Kansas City Overflow ARU"
                 'CHCARU';           "Chicago Overflow ARU"
TABLE TELENDAY = ('SAN_ANTONIO',33), "Telecatalogue Nonwork"
                 ('GREENSBORO',34),  "Day Table"
                 ('WICHITA',33);
TELNR ERRMSG   = 8003335555;        "Error Recording"
                                    "Destination"
TIME WORKDAY   = 06:15,20:45,       "Roanoke Work Hours"
BEGIN;
IF STIME EQ WORKDAY THEN
  SELECT (TELECAT, ARUSITES),BALANCE,ERRMSG;
  ALLOCATE TELENDAY;
  END;
```

In this example, the system variables are not specifically illustrated.

The rule variables include as static variables a group of ACD's under the designator TELECAT, and a list of IP's under the designator ARUSITES. A table identified TELENDAY includes an allocation list and associated dynamically updatable allocation percentages. Additionally, a dynamically updatable error message number is defined, as well as dynamically updatable hours for a typical workday.

The call routing instructions commence with a BEGIN instruction followed by a logic statement determining if the system time falls within the working hours specified under the designator WORKDAY. If so, then a SELECT statement is used to provide load balancing. The SELECT statement uses the TELECAT resource table at the first precedence level and the ARUSITES resource table at the second precedence level. No third precedence level is specified. The BALANCE parameter indicates the technique used for balancing, while the default ERRMSG indicates the recording to be used as the last choice destination if the call is not otherwise properly routed. If the system time is not within the normal work hours, then the logic proceeds to the ALLOCATE function which allocates based on the allocation percentages present under the TELENDAY table.

The allocation percentages used in the ALLOCATE statement can be entered by the subscriber. The capacity percentages used with the SELECT statement cannot be entered. Instead, the client specifies desired performance and the algorithm calculates the capacity percentages every processing cycle.

The routing rules are created using the business subscriber terminal 116 and its associated preconfigured displays. In so doing, a subscriber can select dynamic rule modification, routing rule activation, refreshal of routing rules and destination management. Each comprises a hierarchy of displays in which the subscriber enters the necessary information according to the desired function. For example, with a dynamic tree modification display, the subscriber can select a routing rule for modification and then the types of modifications and dynamic variables for which changes are to be made. With an allocation table, the allocation percentages can be modified, provided that the percentages add up to one hundred percent. Time decision points in the routing rule can be modified, as well as dates.

A routing rule is activated by selecting the rule and assigning an N00 number to a previously created rule to immediately start use of the same. The rule can be used by multiple N00 numbers.

The routing rule refresh function resets all rules to the original format prior to any dynamic rule modifications. An individual rule can be reset by selecting routing rule activation.

All of the above display functions relate to maintaining routing rule tables.

The destination view management function allows the subscriber to configure and display resources for viewing polled statistics.

Also provided is a facility to allow the subscriber to enter in by resource, for example an ACD gate, the performance to be maintained in each of the three available precedence levels. In a resource service level management table, the subscriber designates at each precedence level the number of seconds within which 90% of the calls are to be answered for each resource. If no options are selected, then the default performance target is for ninety percent of all calls to be answered in twenty seconds or less. This information is used in the algorithm for generating call capacity tables to specify a maximum queue length acceptable at each precedence level.

The call capacity table is created for each ninetieth percentile performance target. The tables have an entry with an acceptable queue length for each potential number of agents at the gate. Standard Erlang's B-tables are the starting point for the initial tables. Erlang's B formula predicts the performance of an end-server device fed by a single queue whose length is limited. Once the maximum queue length is reached, then further arrivals bypass the queue. Under the illustrated embodiments, pure Erlang tables are not utilized since the system violates the equilibrium assumption of the Erlang equations by intervening every thirty seconds to adjust the rate of traffic to the ACD gates. This indirectly resets the queue length. Because random fluctuations are not allowed to overload a gate, it can maintain high performance with longer queues than the pure equilibrium state equation suggests. Therefore, test results are used from simulation modeling to establish anchor points to extrapolate the Erlang curves.

Routing Processor

Figure 4:
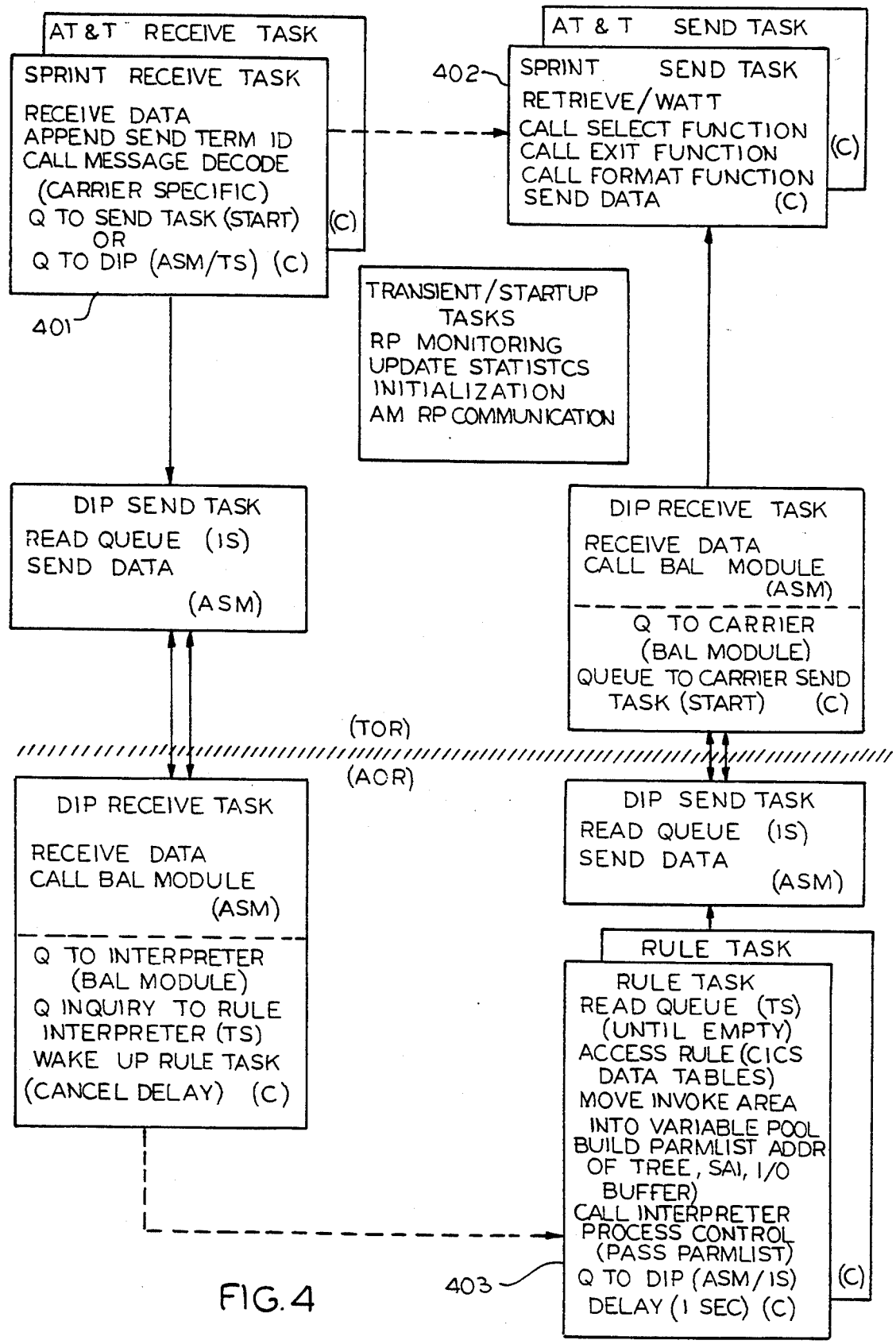
FIG. 4 is a flow diagram illustrating operation of the routing processor of FIG. 2.

With reference to FIG. 4, a flow diagram illustrates interrelationship of the tasks implemented in the routing processor CICS region.

Communications with a carrier, such as Sprint or AT&T, use send/receive pipes using a generic receive task 401 which calls a carrier-specific message inbound decoding routine. The receive task 401 reads an input from a receive pipeline, determines the appropriate send task on which to return the response, prefix the message with the CICS terminal ID and recall the message decode routine. After decoding is performed, the message is either queued back to the send task 402, queued to the AOR for further processing, or logged, based on the action indicator setting. The inbound message decode routine takes the input format used by the carrier and performs any reformatting to internal AIN formats or response formats as necessary. The message decoder returns an action indicator to inform the main line as to the disposition of the message. Three other processing routines include queue to DTP, queue to send, and error logging. The queue to DTP routine passes a pointer to the message to be queued, and the name of the target remote CICS region.

The queue to DTP routine passes a pointer to the message to be queued, and the name of the target remote CICS region. This routine builds a parm list containing the address of the data to be queued, the length of the data, the type of queuing to be performed (in this case, queue to connection group). This parm list is passed to a routine which does the actual queuing. A return code is set in the parm list to indicate the result of the queuing attempt. At the bottom of the infinite loop a delay for one minute is issued before returning to the top to begin reading the queue again. If inquiries are added to the queue during this delay time, the task queues the inquiries to the interpreter, issues a cancel for the delay, thus waking up the sleeping rule interpreter.

Communications with a carrier using send/receive pipes are done using a generic send task 402 which calls carrier specific outbound message processing and formatting routines. The send task 402 first reads data from its queue using a retrieve/wait facility. The carrier specific message outbound processing is called at this point to determine further processing for the message. After the processing is complete, it is possible to call an exit function to perform additional processing if necessary. The outbound message formatting routine places the message into the format expected by the carrier to which it will be sent. Lastly, the message is sent to the carrier via a SEND command.

Multiple rule tasks 403 may be started and run in parallel, primarily for failure recovery purposes. The main processing routine consists of an infinite loop in which it attempts to read and process an inquiry queue until it is empty, and then wait for one minute before returning to the top of the loop. The main routine accesses a pointer to the next item to be processed.

The inquiry queue is initially a temporary storage queue. The pointer is enqueued upon, the inquiry read from the queue, the pointer updated to reflect the next item to be read, then a de-queue is issued to release the pointer. Another task is then queued on the pointer, then the rule task waits for it to become available.

The inquiry record contains an 800 number which is checked against the active rule table to determine which routing rule is selected for processing. Each N00 number is associated with a particular rule in this initialization time, as discussed above, based on information from the activity monitor 134. Once the routing rule name has been determined, then the rule, residing on a subscriber maintained data table, is retrieved. Pointers to the rule, the inquiry record, the AIN anchor table, and the IO buffer are passed to the interpreter function. The interpreter function executes the routing rule and builds the outcome record in the IO buffer. The main processing then calls the queue to DTP routine to send the outcome record back to the TOR.

Figure 5:
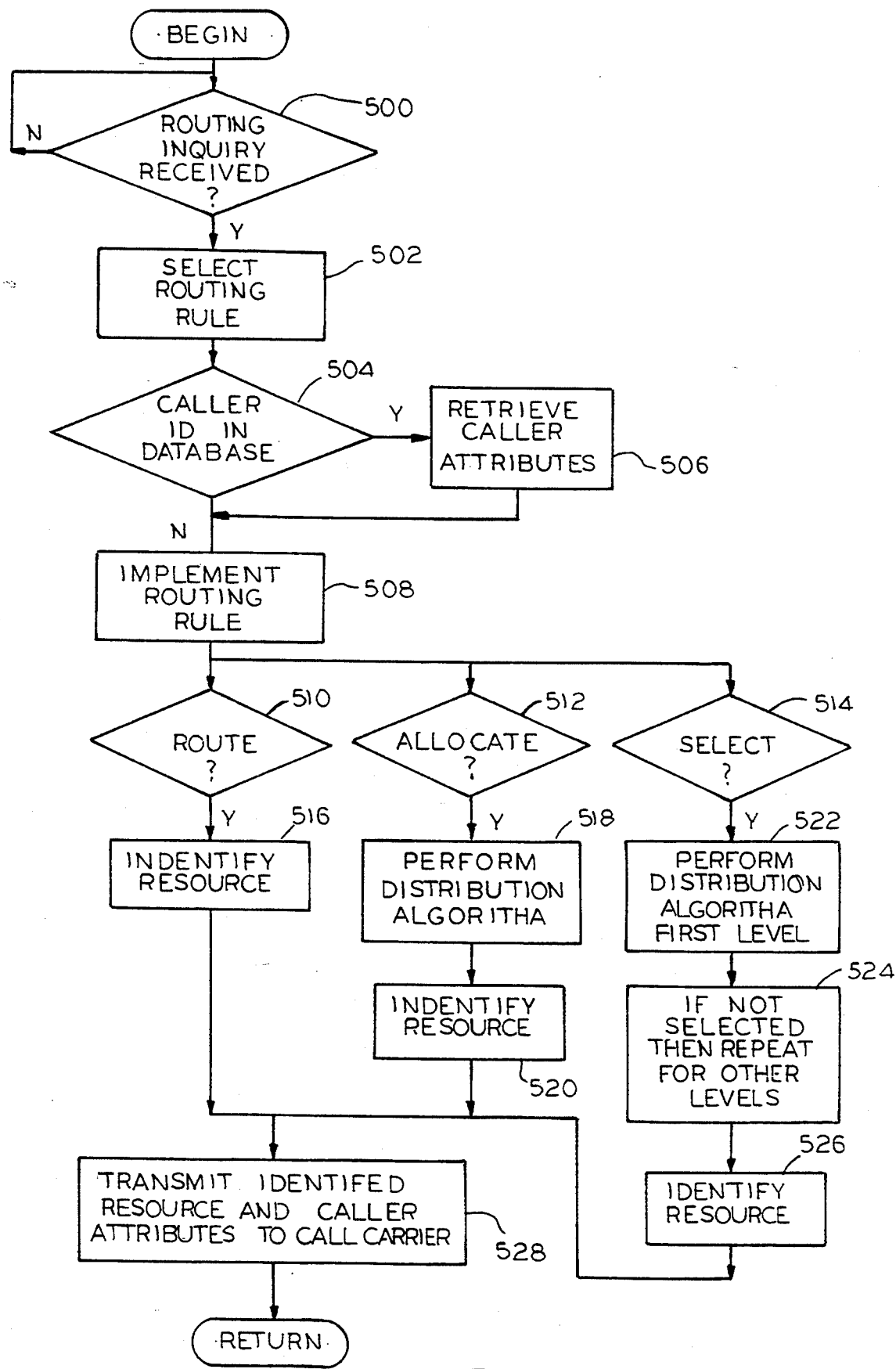
FIG. 5 is a flow diagram illustrating operation of the routing rule task of the flow diagram of FIG. 4.

With reference to FIG. 5, a flow diagram further illustrates operation of the rule task 403 of FIG. 4. The main routine begins at a decision block 500 which determines if a routing inquiry has been received. If none is received, then no action is taken. Particularly, the routing query is received from the carrier SCP 106, see FIG. 1. If one is received, then a routing rule is selected at a block 502. The N00 Number dialed by the caller, contained in the routing query, is used to select the rule as defined when the rule is activated. The routing rule may already be in the memory of the AIN processor 114 or may have to be loaded into the memory from DASD storage 138. At a decision block 504, the caller identity, if available, is checked against the subscriber's customer database 118, see FIG. 1. If a match is found, then caller attributes contained in the customer database 118 are retrieved at a block 506 for use in routing the call. The routing rule is then implemented at a block 508.

The routing rule is implemented at the block 508 by executing the call routing instructions 204, see FIG. 3, for the selected rule. Particularly, the caller attributes and call characteristics are compared to the various screening criteria specified by the subscriber in the call routing instructions. The screening criteria consists of lists of possible values of the caller attributes and call characteristics. Logical comparisons are performed between the actual values of the caller attributes and call characteristics for the particular call being processed and the values contained in the system variable list 200 and rule variable list 202. The format of each list depends on the caller attribute or call characteristics being screened. For example, if the originating area code, or NPA, of the caller is being compared, then the list would contain a sequence of possible NPA values. A successful logical comparison would occur if one of the values in the list equalled the originating NPA. In another example, if the time of day is being compared, then the list would contain two time values. A successful logical comparison occurs if the time of day the call is being made is between the two time values in the list.

The call characteristics come partly from the carrier and are contained in the call routing inquiry. These include such items as the NPA-NXX-XXXX of where the call is originating, any caller entered digits, and any information known to the PSTN 100 about the line the call is originating on, such as class of service, terminal type, business group, etc. Other call characteristics come from the AIN processor 114 and include such items as the current date, time and day of week, and customer business information. Based on successful matches between the call information and the screening criteria, one of three routing functions is chosen in the routing rule. The three routing functions are a ROUTE function made in decision block 510, an ALLOCATE function in a decision block 512, and a SELECT function in a decision block 514.

If a ROUTE function is to be performed, as determined at the block 510, then the outcome record contains an internal destination identifier at a block 516. This is then resolved into the carrier's destination tag.

In the case of an ALLOCATE function, as determined at the block 512, the outcome record contains a vector of internal destination identifiers accompanied by the percentage of all calls each destination is to receive. The percentages must total one hundred. A distribution algorithm is implemented at a block 518 for designating one of the destinations using the percentages. The identifier for the destination is resolved to a carrier destination tag at a block 520.

SELECT function processing from the block 514 is similar to allocate processing. The outcome record contains an outcome identifier. The outcome identifier points to a table entry containing resource group identifiers for each precedence level. The entry is terminated by a network treatment identifier or other last choice destination. Beginning with the first precedence level, the routing processor 132 uses the resource group identifier to locate an entry in a table of destinations by resource group. The destination identifier's point entry is in a capacity table that contains the output of the output table generated by the activity monitor 134. For each precedence level reached, a distribution algorithm is implemented at blocks 522 and 524 using the capacity percentages within that precedence level. When the destination is selected, then the destination identifier is resolved into a carrier destination tag at a block 526. If no destination passes the test, then the calls will be directed away from the customer destination and presented to the carrier for network treatment, or delivery to a last choice destination.

For example, during non-business hours during the week and all day on weekends the subscriber may have only one resource operational. During those times all calls would be routed to a single resource at a designated location. In another example, calls during the business day west of the Mississippi River are to be equally distributed among three West Coast locations. In this case an allocation function is used with the percentages set to one third for each of the locations. In still another example, the subscriber has ten locations throughout the country. The fifty states are divided into ten groups with calls from each group routed to the nearest location as a first choice route. If the resource is predicted to be busy at the first choice location, then the call is routed to a second choice which may include any of the locations in the country. If all of the second choice locations are predicted to be busy, then the call is queued at the nearest location.

The final result produced by any of the three routing functions at the block 516, 520 and 526 is a single resource identifier which constitutes the routing response sent at a block 528 into the carrier's SCP 106. There may be additional information about the call or caller obtained during the routing process that is included in the carrier routing response to be delivered along with the call to the subscriber resource. This information may .include, for example, the caller attributes obtained from the caller database 118, as discussed above. From the block 528, the routine returns as by looping back to the beginning of the same.

Figure 6:
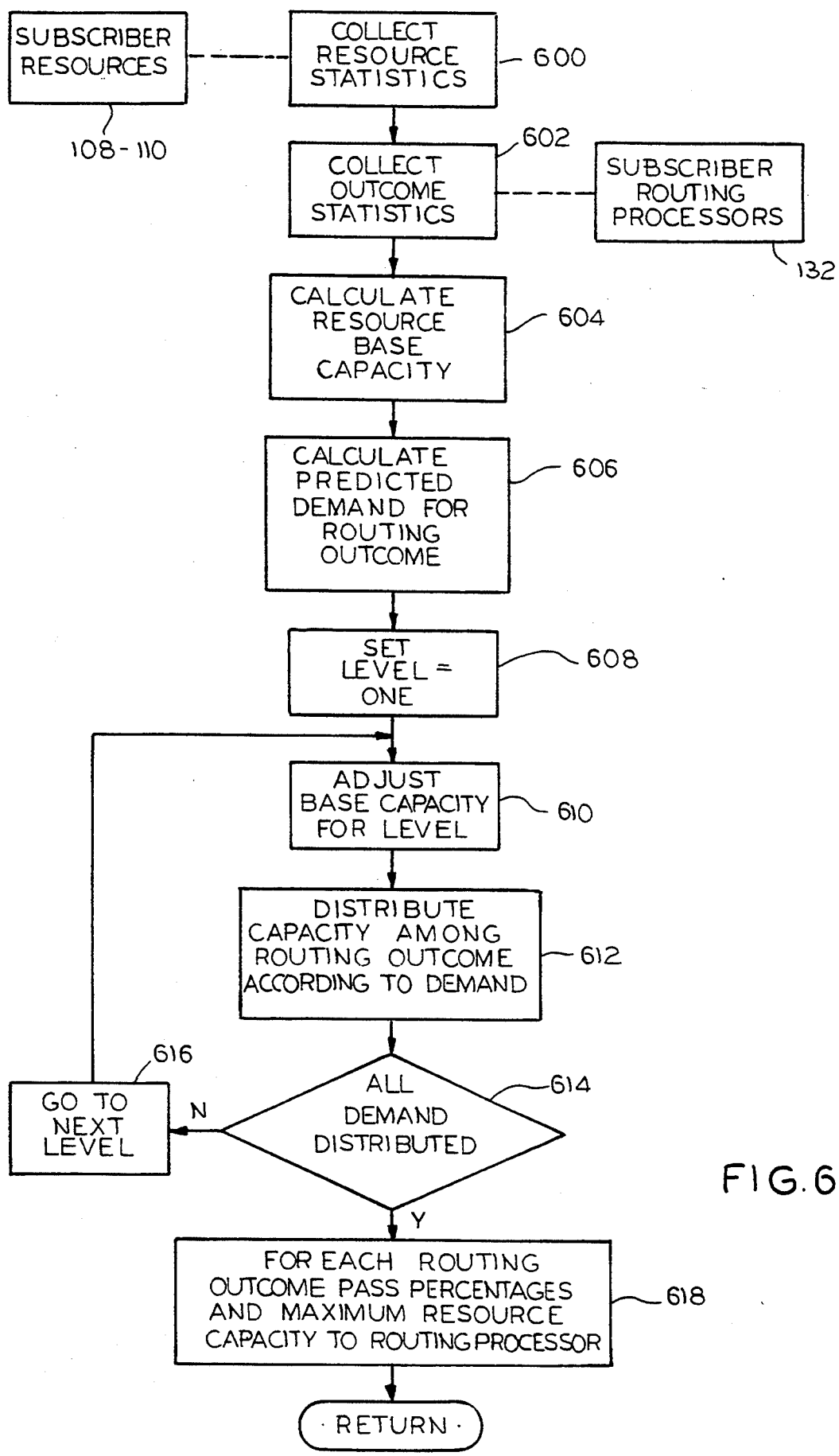
FIG. 6 is a flow diagram illustrating operation of a program for the load balancing algorithm implemented in the activity monitor.

With reference to FIG. 6, a flow diagram illustrates operation of the routing algorithm performed once each processing cycle for generating the outcome table describing the destinations and preference to which calls are routed by the routing processor for the SELECT function. Particularly, the load balance algorithm runs continuously and as soon as one process ends a subsequent one begins. The length of time it takes to complete one load balance process is termed a processing cycle. In the illustrated embodiment of the invention, each processing cycle takes approximately thirty seconds to complete.

The algorithm begins at a block 600 by collecting resource statistics from the subscriber resources. The subscriber resources include ACD's, ARU's, etc. The information collected from each resource includes the number of devices currently active, the number of devices currently idle, and the number of calls currently queued to the resource. For example, a resource may be a group of agents at an ACD with the device being each individual agent, or a resource might be an audio response unit with the device being each individual port on the system. At a block 602, real time outcome statistics are collected from each subscriber routing processor 132. The number of routing processors 132 is dependent on the volume of routing queries and there is typically a minimum of two for reasons of reliability. The statistical information collected from each routing processor 132 includes the number of calls routed to each resource 108-110 and the number of calls for each routing outcome during the most recent processing cycle. Calls that match a particular set of screening criteria are handled by a routing outcome. Particularly, the routing outcome is a SELECT function included in any of the programmed routing rules. For example, a routing outcome might handle all calls west of the Mississippi River, or all calls from non-English speaking customers, or calls from the southeastern part of the country between 10:00 a.m. and noon on Mondays. The routing outcome is a preferred list of resources that are allowed to handle the call. The list may include all of the resources that the subscriber has or a subset of those resources. A resource may appear in many routing outcomes.

The list of resources is organized into groups, first choice, second choice and third choice, with one or more resources in each group. Each level of choice is defined as a precedence level and the same resource may appear in one or more levels.

At a block 604, the resource base capacity for each resource is calculated. The base capacity represents the call activity that can be sent to each resource so there are no calls in queue or idle resources at the end of the next processing cycle. This is referred to herein as a "zero queue length number". Particularly, the call carrying capacity of each resource is calculated based on the calls actually routed to the resource during the most recent processing cycle, and the impact that volume of calls had on the number of devices idle and number of calls in queue as reported at the end of the processing cycle. The change in the number of devices active is taken into account which may reflect such circumstances as additional agents reporting for work or beginning a lunch break. The figure calculated for each resource is a base capacity which represents the call volume which can be sent to the resource in the next processing cycle which results in no devices idle and no calls in queue at the end of that processing cycle.

At a block 606, a predicted demand for each routing outcome is calculated. This comprises a moving average of the number of calls for each routing outcome for the two most recent processing cycles to predict what the call demand for that routing outcome will be in the next processing cycle.

At a block 608, a precedence level value is set equal to one to provide for calculating load balancing for the first precedence level. For each resource, the subscriber defines the performance criteria to be applied for each precedence level. The precedence level one criteria indicates the maximum queue length that the subscriber will allow for the resource as a first choice in any routing outcome. The base capacity plus the maximum queue length at the level is equal to the call carrying capacity of the resource at the first precedence level. This is done by adjusting the base capacity for the level at a block 610. The load balancing process then distributes the call carrying capacity of each resource among the routing outcomes according to demand at the first precedence level at a block 612. If a resource appears in more than one group at the same precedence level, then that resource's call capacity is distributed between the groups in proportion to the call demand being made on each group. For multiple resources in a group, the call capacity of each resource is used to the same degree, that is, for the same percentage of the available capacity.

At a decision block 614, a determination is made if all demand has been distributed at the current precedence level. If demand remains after all the possible capacity at this precedence level has been used, then the load balance process advances to a block 616 which advances to the next precedence level and then returns to the block 610. New resources may make themselves available to a routing outcome at the next precedence level as it is adjusted at the block 610. Thereafter, at the block 612, the system attempts to distribute any unused capacity for these resources. Particularly, the call carrying capacity at this precedence level is calculated for each resource. This is done by adding any unused capacity still remaining to the increase in queue length allowed between this precedence level and the prior one. The load balance distribution is then repeated and the decision block 614 again determines if all demand has been distributed. In the described embodiment of the invention, there are three precedence levels and this loop is performed up to three times, once for each precedence level.

When all demand has been handled for all routing outcomes, then for each routing outcome a set of demand distribution capacity percentages and maximum resource capacities is passed to the routing processor at a block 618. The call routing process uses these percentages and capacities to route calls for that routing outcome during the next processing cycle. The next load balancing processing cycle then begins.

The call routing process applies the capacity percentages for each precedence level to each call routed according to a particular routing outcome. The result is a call routed to a particular resource or the call spilling to the next precedence level. A cumulative count is maintained of the calls routed to each resource and when that count exceeds the maximum resource capacity at a given precedence level, then the call is not routed to that resource but instead spills to the next precedence level.

The following is an example of how the load balancing algorithm is implemented. In this example, four routing outcomes are defined as follows:

ROUTING OUTCOME 1: SELECT (A, (A, B), (A, B, C, D)), BALANCE, ERRMSG
LEVEL 1—DESTINATION A
LEVEL 2—A, B
LEVEL 3—A,B,C,D
ROUTING OUTCOME 2: SELECT (B, (A, B), (A, B, C, D)), BALANCE, ERRMSG
LEVEL 1—B
LEVEL 2—A, B
LEVEL 3—A,B,C,D
ROUTING OUTCOME 3: SELECT (C, (C, D), (A, B, C, D)), BALANCE, ERRMSG
LEVEL 1—C
LEVEL 2—C,D
LEVEL 3—A,B,C,D
ROUTING OUTCOME 4: SELECT (D, (C, D), (A, B, C, D)), BALANCE, ERRMSG
LEVEL 1—D
LEVEL 2—C,D
LEVEL 3—A,B,C,D

In this example, the following Table 1 lists resource statistics collected as at the block 600 of FIG. 6 during previous processing cycles.

TABLE 1

| | MOST RECENT POLL | | | | 2ND MOST RECENT POLL | | | |
|---|---|---|---|---|---|---|---|---|
| DEST | PPM | AAV | Q | ACTUAL CALLS HANDLED | PPM | AAV | Q | ACTUAL CALLS HANDLED |
| A | 78 | 2 | 0 | 5 | 75 | 0 | 4 | 10 |
| B | 100 | 0 | 2 | 21 | 100 | 10 | 0 | 15 |
| C | 125 | 5 | 0 | 18 | 125 | 10 | 0 | 13 |
| D | 5 | 1 | 0 | 0 | 0 | 0 | 0 | 0 |

In Table 1, the heading PPM designates primary positions manned, the heading AAV designates agents available, and the heading Q designates the number of calls in queue.

The following Table 2 illustrates by way of example outcome statistic information collected at the block 602, see FIG. 6, from the routing processor 132.

TABLE 2

| ROUTING OUTCOME | MOST RECENT POLL ACTUAL CALLS ROUTED | 2ND MOST RECENT POLL ACTUAL CALLS ROUTED |
|---|---|---|
| 1 | 12 | 20 |
| 2 | 14 | 6 |
| 3 | 10 | 5 |
| 4 | 8 | 7 |
| TOTAL | 44 | 38 |

For this example, it is assumed that the allowable queue length at level one for all destinations is zero, at level two for all destinations it is one, and at level three for all destinations it is four.

The algorithm initially calculates base capacity for each resource as follows:

STEP 1.0: Calculate base capacity for each resource.
STEP 1.1: Resource A $C = AAV - Q - PPM$ delta $C$ = current cycle − prior cycle base = prev cycle (calls handled) + AAV − Q + delta $C$ (see Note 1 below) $C = 2 - 0 - 78 = -76$ Delta $C = -76 - (0 - 4 - 75) = 3$ base $= 5 + 2 - 0 + 3 = 10$
STEP 1.2: Resource B base $= 21 + 0 - 2 + (-12) = 7$
STEP 1.3: Resource C base $= 18 + 5 - 0 + (-5) = 18$
STEP 1.4: Resource D base $= 0 + 1 - 0 + (-4) = -3$
since the result is less than the number of agents currently available then set equal to AAV = 1

Note 1: The formula for base capacity is arrived at as follows: a) The base capacity is the call load that will result in zero agents available and zero calls in queue at the end of the next processing cycle. b) Starting with the calls actually handled in the most recent cycle, add the agents available and subtract the calls in queue as of the end of the most recent cycle. The assumption is that the average call length is much longer than a processing cycle. c) Adjust the result based on the change in agents available and change in queue length between the end of the most recent processing cycle and the prior one. To the result in b) add the increase in agents available and subtract the increase in calls in queue. d) If the increase in agents available came from an increase in agent positions manned (PPM) subtract the PPM increase from the agents available increase.

The next step calculates the predicted demand for each routing outcome as follows:

STEP 2.0: Calculate predicted demand for each routing outcome
STEP 2.1: Outcome 1

$$\text{demand} = (\text{current calls routed} + \text{previous calls routed})/2$$
$$= (12 + 20)/2 = 16$$

STEP 2.2: Outcome 2 demand $= (14+6)/2 = 10$
STEP 2.3: Outcome 3 demand $= (10+5)/2 = 7.5$
STEP 2.4: Outcome 4 demand $= (8+7)/2 = 7.5$ Next, the adjusted base capacity is calculated at precedence level 1, as follows:

STEP 3.0: Calculate adjusted base capacity at precedence level 1
STEP 3.1: Resource A $$L1\text{cap} = \text{base} + \text{acceptable Q length at level 1}$$
$$= 10 + 0 = 10$$

STEP 3.2: Resource B L1cap $= 7 + 0 = 7$
STEP 3.3: Resource C L1cap $= 18 + 0 + 18$
STEP 3.4: Resource D L1cap $= 1 + 0 = 1$ At this point, it is possible to distribute the capacity among the routing outcomes according to demand at the first precedence level. This is done as follows:

STEP 4: For each resource group calculate the fraction of each outcome's demand handled by that resource group at precedence level 1. If there are multiple resources in the group prorate across each individual resource. Perform both of these steps by prorating based on the adjusted capacity of each resource.

STEP 4.1: Resource A All capacity is used for Outcome 1 and is less than demand. Fraction of outcome 1 handled = L1cap/demand = 10/16 = 0.625 6 calls from Outcome 1 spill to Level 2

STEP 4.2: Resource B

All capacity is used for Outcome 2 and is less than demand fraction of outcome 2 handled = 7/10 = 0.700 3 calls from Outcome 2 spill to Level 2

STEP 4.3: Resource C

All capacity is used for Outcome 3 and is greater than demand fraction of outcome 3 handled = 1.0 Resource C has 10.5 calls available for Level 2

STEP 4.4: Resource D All capacity is used for Outcome 4 and is less than demand fraction of Outcome 4 handled = 1/7.5 = 0.1333 6.5 calls from Outcome 4 spill to Level 2

Once the distribution is completed at Level 1 without all demand being distributed, then new adjusted capacities for each resource at level 2 are calculated as follows:

STEP 5.0: Calculate new adjusted capacities for each resource at Level 2 by adding the unused capacity from Level 1 to the increase in acceptable Q length between Levels 1 and 2.

STEP 5.1: Resource A $$L2cap = \text{unused capacity from L1cap} + \text{increase in Q length}$$
$$= 0 + 1 = 1$$

STEP 5.2 Resource B L2cap = 0 + 1 = 1
STEP 5.3 Resource C L2cap = 10.5 + 1 = 11.5
STEP 5.4 Resource. D L2cap = 0 + 1 + 1

Next, the remaining capacity is distributed among the routing outcomes according to demand at Level 2 as follows:

STEP 6: For each Resource group calculate the fraction of each outcome's demand handled by that group at precedence level 2. If there are multiple resources in the group prorate across each individual resource.

STEP 6.1: Resource Group 2.1—Group 1 at Level 2 comprised of Resources A and B resource group capacity = sum of each resource = L2cap(A) + L2cap(B) = 1 + 1 = 2 total demand on RG2.1 = sum of spilled calls from each outcome = 6 (Outcome 1) + 3 (Outcome 2) = 9 fraction of demand handled = capacity/demand = 2/9 = 0.2222 (this fraction applies to both outcome 1 & outcome 2) fraction of demand spilled = 1 − fraction of demand handled = 1 − 0.2222 = 0.7778 calls spilled from each outcome = demand to Level 2 * fraction of demand spilled = 6 (Outcome 1) * .7778 = 4.667
= 3 (Outcome 2) * .7778 = 2.333

STEP 6.1.1: Resource A fraction of RG2.1 capacity = L2cap(A)/resource group cpacity
= 1/2 = .5 fraction of demand handled = fraction of capacity * fraction of demand
= .5 * .2222 = .1111

(this fraction applies to both outcome 1 and outcome 2) unused capacity available to Level 3 = 0

STEP 6.1.2: Resource B fraction of RG2.1 capacity = L2cap(B)/resource group capacity = ½ = 0.5 fraction of demand handled = fraction of capacity * fraction of demand
= .5 * .2222 = .1111

(this fraction applies to both outcome 1 and outcome 2) unused capacity available to Level 3 = 0

STEP 6.2: Resource Group 2.2—Group 2 at Level 2 comprised of Resources C and D resource group capacity = sum of each resource = L2cap(C) + L2cap(D) = 11.5 + 1 = 12.5 total demand on RG2.2 = sum of spilled calls from each outcome = 0 (Outcome 3) + 6.5 (Outcome 4) = 6.5 fraction of demand handled = 1.0 since capacity > demand (this fraction applies to both outcome 3 & outcome 4) fraction of demand spilled = 0

STEP 6.2.1: Resource C fraction of RG2.2 capacity = L2cap(C)/resource group capacity = = 0.92 fraction of demand handled = fraction of capacity * fraction of demand
= .92 * 1.0 = .92

(this fraction applies to both outcome 3 and outcome 4) unused capacity available to Level 3 = L2cap(C) − (demand * fraction of demand handled) 11.5 − (6.5 * 0.92) = 5.52

STEP 6.2.2: Resource D fraction of RG2.2 capacity = L2cap(D)/resource group capacity = 1/12.52 = 0.08 fraction of demand handled = fraction of capacity * fraction of demand
= .08 * 1.0 = .08

(this fraction applies to both outcome 3 and outcome 4)

unused capacity available to Level 3 = L2cap(D) −
(demand * fraction of demand handled)
1 − (6.5 * .08) = 0.48

With not all demand yet handled, the new adjusted capacities for each resource at Level 3 are calculated as follows:

STEP 7.0: Calculate new adjusted capacities for each resource at Level 3 by adding the unused capacity from Level 2 to the increase in acceptable Q length between Levels 2 and 3.

STEP 7.1: Resource A L3cap = unused capacity from L2cap + increase in Q length = 0 + 3 = 3

STEP 7.2: Resource B L3cap = 0 + 3 = 3

STEP 7.3: Resource C L3cap=5.52+3=8.52
STEP 7.4: Resource D L3cap=0.48+3=3.48
This demand is then distributed in step 8 as follows:
STEP 8.0: For each Resource group calculate the fraction of each outcome's demand handled by that group at precedence level 3. If there are multiple resources in the group prorate across each individual resource.
STEP 8.1: Resource Group 3.1—Group 1 at Level 3 comprised of Resources A, B, C, and D resource group capacity=sum of each resource=L3cap-(A+B+C+D)=3+3+8.52+3.48=18 total demand on RG3.1=sum of spilled calls from each outcome=4.667 (Outcome 1)+2.333 (Outcome 2)=7 fraction of demand handled=1.0 (this fraction applies to both outcome 1 & outcome 2) fraction of demand spilled=0
STEP 8.1.1: Resource A fraction of RB3.1 capacity=L3cap(A)/resource group capacity=3/18=0.167

$$\text{fraction of demand handled} = \text{fraction of capacity} * \text{fraction of demand}$$
$$= .167 * 1.0 = .167$$

(this fraction applies to both outcome 1 & outcome 2)
STEP 8.1.2: Resource B fraction of RG3.1 capacity=L3cap(B)/resource group capacity=3/18=0.167

$$\text{fraction of demand handled} = \text{fraction of capacity} * \text{fraction of demand}$$
$$= .167 * 1.0 = .167$$

STEP 8.1.3: Resource C fraction of RG3.1 capacity=L3cap(C)/resource group capacity==0.473

$$\text{fraction of demand handled} = \text{fraction of capacity} * \text{fraction of demand}$$
$$= .473 * 1.0 = .473$$

(this fraction applies to both outcome 1 & outcome 2)
STEP 8.1.4: Resource D fraction of RG3.1 capacity=L3cap(D)/resource group capacity==0.193

$$\text{fraction of demand handled} = \text{fraction of capacity} * \text{fraction of demand}$$
$$= .193 * 1.0 = .193$$

(this fraction applies to both outcome 1 and outcome 2)
Finally, with all demand having been distributed and no demand spilling to the last choice destination, the outcome tables are generated so that the determined fractions can be passed to the routing processor 132 as follows:
STEP 9.0: The fractions passed to the Routing Processor 132 are as follows:

| | Fraction of an Outcome's demand handled by each Resource | | | | | | | | | | | |
|---|---|---|---|---|---|---|---|---|---|---|---|---|
| | Outcome 1 | | | Outcome 2 | | | Outcome 3 | | | Outcome 4 | | |
| | L1 | L2 | L3 | L1 | L2 | L3 | L1 | L2 | L3 | L1 | L2 | L3 |
| Resource A | .625 | .111 | .167 | | .111 | .167 | | | | | | |
| Resource B | | .111 | .167 | .700 | .111 | .167 | | | | | | |
| Resource C | | | .473 | | | .473 | 1.0 | | | | .920 | |
| Resource D | | | .193 | | | .193 | | | | | .133 | .080 |
| Spillover | .375 | .778 | 0 | .300 | .778 | 0 | 0 | 0 | | .867 | 0 | |

Following is the table of fractions converted to the number of calls based on the predicted demand.

| | Call count of an Outcome's demand handled by each Resource | | | | | | | | | | | |
|---|---|---|---|---|---|---|---|---|---|---|---|---|
| | Outcome 1 16 | | | Outcome 2 10 | | | Outcome 3 7.5 | | | Outcome 4 7.5 | | |
| Demand | L1 | L2 | L3 | L1 | L2 | L3 | L1 | L2 | L3 | L1 | L2 | L3 |
| Res A | 10 | .666 | .780 | | .333 | .390 | | | | | | |
| Res B | | .666 | .780 | 7 | .333 | .390 | | | | | | |
| Res C | | | 2.21 | | | 1.10 | 7.5 | | | | 5.98 | |
| Res D | | | .901 | | | .450 | | | | 1 | 0.52 | |
| Spill | 6 | 4.67 | 0 | 3 | 2.334 | 0 | 0 | 0 | 0 | 6.5 | 0 | 0 |

| | Total Demand |
|---|---|
| Res A | 12.169 |
| Res B | 9.166 |
| Res C | 16.79 |
| Res D | 2.871 |
| | 41 |

During the subsequent processing cycle calls routed based on one of the four routing outcomes use these tables for making the routing decision, as discussed above relative to FIG. 5.

In summary, the AIN processor 114 provides call-by-call routing to provide businesses with the maximum routing flexibility possible and allows for the effective management of call centers, call center agents, and other resources, independent of the public switched telephone network 100. Calls can be routed based on the specific identity of the caller. Even more importantly, calls can be routed based on the availability of each resource relative to the desired performance criteria.

The number translation and routing decision is based on cooperative processing performed in both the carrier's SCP 106 and the subscriber's AIN processor 114. A query is launched from the carrier's SCP 106 to the subscriber's AIN processor 114 with all information known about the call. The AIN processor 114 makes the actual number translation and routing decision which is returned to the carrier SCP 106 which implements the decision within the carrier network. With cooperative processing, the carrier SCP 106 can route all calls using the current non-dynamic routing process should there be a temporary failure in the AIN processor 114. There may also be periods of time when the subscriber's AIN processor 114 is planned not to be operational, such as when N00 calling volume is low and a non-dynamic routing process is satisfactory.

APPENDIX

Call Management Language
Copyright 1990, Sears Technology Services Inc.

Backus Naur Form

The Call Management Language is defined in the Backus Naur Form (BNF). BNF notation is intended to represent the basic language syntax. This document does not attempt to define the complete semantical form of the language. There are instances where the language representation deviates from the formal BNF syntax. This is necessary to further define the valid representation of a given symbol or production. The following is a brief explanation of the BNF symbols used in this paper.

| BNF Symbol | Explanation |
|---|---|
| ::= | Is defined as |
| \| | Or |
| * | Include one or more elements from the defined string |
| < > | Defines a Nonterminal or variable symbol.<br>Example:<br>    <DIGIT><br>        DIGIT is a Nonterminal or variable symbol. Nonterminal symbols may appear on the left or right of the 'is defined as' symbol. These symbols are represented as upper case strings and are ultimately defined by Terminal symbols. Terminal symbols are the basic elements of the language. Terminal symbols are represented as lower case strings. The following are self defining Terminal symbols:<br>        1 2 ... 9 0   A B ... Y Z   a b ... y z<br>        + - * / _ #   : " ' ( ) @ .<br>        Reserve Words and System Functions belong to the Terminal symbol class. A symbol Label is represented by an italicized Terminal symbol when used to specify a given symbol within a symbol class.<br>    Example:<br>      <var IDENTIFIER> <LOGICAL FUNCTION> <CONSTANT><br>      The symbol var represents the Label of an Identifier Declaration |
| { } | Defines a required symbol |
| [ ] | Defines an optional symbol |

| | | Examples |
|---|---|---|
| LETTER | ::= A\|B......\|Z | A LETTER is defined as any character from A to Z. |
| DIGIT | ::= 1\|2\|3\|4\|5\|6\|7\|8\|9\|0 | A DIGIT is defined as any number from one to zero |
| ALPHANUMERIC | ::= <LETTER>\|<DIGIT><br>[<DIGIT>\|<LETTER>]* | An ALPHANUMERIC is defined as a string of LETTERS or DIGITS in any sequence |
| LABEL | ::= <LETTER><ALPHANUMERIC> | A LABEL is defined as a LETTER followed by one or more LETTERs or DIGITs in any sequence |

Reserve Words

The following words have special meaning to the Call Management Language.

```
BUSY01                      ::= 01
BUSY02                      ::= 02
BUSY03                      ::= 03
BUSY04                      ::= 04
CHRISTMAS                   ::= 12/25/yy
FRIDAY                      ::= Week Day 6
JULY4TH                     ::= 07/04/yy
INQ_ID                      ::= Inquiry Identification
MATH_ERR                    ::= Arithmetic Expression return code area
MIDNIGHT                    ::= 00:00 AM
MONDAY                      ::= Week Day 2
NEWYEAR                     ::= 01/01/yy
NOON                        ::= 12:00 PM
ONE                         ::= 1
READ_EOF                    ::= End-of-File
READ_ERR                    ::= Miscellaneous Error
READ_RNF                    ::= Record Not Found
REJECTCD                    ::= BUSY01 | BUSY02 | BUSY03 | BUSY04
RT_CODE                     ::= I/O Return Code Area
SATURDAY                    ::= Week Day 7
SELECT_CODE                 ::= Select Code
SUNDAY                      ::= Week Day 1
THURSDAY                    ::= Week Day 5
TUESDAY                     ::= Week Day 3
VOID                        ::= Null
WEDNESDAY                   ::= Week Day 4
WEEKDAY                     ::= MONDAY | TUESDAY | WEDNESDAY | THURSDAY | FRIDAY
WEEKEND                     ::= SATURDAY | SUNDAY
X25LABEL                    ::= X25 Node Label
ZERO                        ::= 0
```

System Identifiers

System Identifiers are software features that are supported by the Operating System that controls the execution of the Call Management Language code. Refer to the routing Processor specifications for the layout of the following areas. These areas are defined in the SAIN Activity Table (SAT).

```
SDATE                       ::= Current System Date
SDAYWEEK                    ::= Current System Day of the Week
SHOUR                       ::= Current System Hour
SMINUTE                     ::= Current System Minute
SMONTH                      ::= Current System Month
STIME                       ::= Current System Time
SDAYYEAR                    ::= Current Day Number Within the Year
```

Primitive Elements

Primitive Elements are the basic components of the Call Management Language. Individual Language Functions are built with these objects.

```
ALPHANUMERIC                ::= <LETTER>|<DIGIT>[<DIGIT>|<LETTER>]*
ARITHMETIC EXPRESSION       ::= {<var IDENTIFIER>|<DIGIT>*}
                                <ARITHMETIC FUNCTION>
                                {<var IDENTIFIER> | <DIGIT>*}
ARITHMETIC FUNCTION         ::= + | - | * | /
CO                          ::= <N><DIGIT><DIGIT>
COMMENTS                    ::= "<ALPHANUMERIC>"
CONSTANT                    ::= <DIGIT>*
                                |'<ALPHANUMERIC>'
DAY                         ::= 01 | 02 |...| 31
DESTINATION                 ::= <LINK TAG> | <TELEPHONE NUMBER>
DIGIT                       ::= 1 | 2 |...| 9 | 0
ERROR INDICATOR             ::= <var IDENTIFIER>
FILE NAME                   ::= <var IDENTIFIER>
                                |'<LETTER><ALPHANUMERIC>'
HOUR                        ::= 00 | 01 |...| 23
```

```
IDENTIFIER            ::= <LETTER><ALPHANUMERIC>
INDEX                 ::= <var IDENTIFIER> | <POSITION>
KEY                   ::= <var IDENTIFIER>
LABEL                 ::= <LETTER><ALPHANUMERIC>
LENGTH                ::= <DIGIT>*
LETTER                ::= A | B |...| Z | a | b |...| z | _ | # | @ | .
LINK TAG              ::= '<LETTER><ALPHANUMERIC>'
LOGICAL EXPRESSION    ::={<date IDENTIFIER> <LOGICAL FUNCTION>
                            <date IDENTIFIER>
                             |<date RESERVE WORD>
                             |<date SYSTEM FUNCTION>
                             |<date CONSTANT>}
                        |{<tag IDENTIFIER> <LOGICAL FUNCTION>
                            <tag IDENTIFIER>
                             |<tag CONSTANT>}
                        |{<telnr IDENTIFIER> <LOGICAL FUNCTION>
                            <telnr IDENTIFIER>
                             |<telnr CONSTANT>}
                        |{<time IDENTIFIER> <LOGICAL FUNCTION>
                            <time IDENTIFIER>
                             |<time RESERVE WORD>
                             |<time SYSTEM FUNCTION>
                             |<time CONSTANT>}
                        |{<var IDENTIFIER> <LOGICAL FUNCTION>
                            <var IDENTIFIER>
                             |<var CONSTANT>}
LOGICAL FUNCTION      ::= lt | gt | eq | ne | ge | le
METHOD                ::= balance | nearest
MINUTE                ::= 00 | 01 |...| 59
MONTH                 ::= 01 | 02 |...| 12
N                     ::= 2 | 3 |...| 9
NPA                   ::= <N>{0 | 1}<DIGIT>
NULL                  ::= [<REPETITION>*]<LENGTH>'' | ''
PERCENT               ::= 0 | 1 |...| 100
POSITION              ::= <DIGIT>*
REPETITION            ::= <DIGIT>*
STATION               ::= <DIGIT><DIGIT><DIGIT><DIGIT>
SUBSCRIPT             ::= (<POSITION>,<LENGTH>)
TELEPHONE NUMBER      ::= <NPA><CO><STATION> | <CO><STATION>
TREATMENT             ::= <DESTINATION>
YEAR                  ::= 90 | 91 |...| 99
```

Language Functions.

Language Functions define the basic features of the Call Management Language that are employed to process a given routing request.

```
ASSIGNMENT            ::= <LABEL>            = <NULL>
                                              |<var IDENTIFIER>[<INDEX>]
                                              |<LABEL>
                                              |<ARITHMETIC EXPRESSION>
                                              |<LOCATE>
                                              |zero
                        |<date IDENTIFIER>  = <LABEL>
                        |<time IDENTIFIER>  = <LABEL>
                        |<var IDENTIFIER>   = <var IDENTIFIER>[<INDEX>]
                                              |<LABEL>
                                              |<ARITHMETIC EXPRESSION>
                                              |<LOCATE>
                                              |zero
                                              |one
CALL TREATMENT        ::= RECORDING <DESTINATION> | <REJECTCD> | default |
                              <telnr IDENTIFIER>[<INDEX>]
DECLARATION           ::= ac <IDENTIFIER>    = <NPA>[,<NPA>]*
                          |acco <IDENTIFIER> = <NPA><<CO>[,<NPA><CO>]*
                          |acd <IDENTIFIER>  = <DESTINATION>[,<DESTINATION>]*
                          |agent <IDENTIFIER> = <NULL>[,<NULL>]*
                          |data <IDENTIFIER> = <NULL>
                                              |<LABEL><SUBSCRIPT>
                                              [,<LABEL><SUBSCRIPT>]*
                          |date <IDENTIFIER> = <MONTH>/<DAY>/<YEAR>
                                              [,<MONTH>/<DAY>/<YEAR>]*
```

```
                        |ip <IDENTIFIER>      = <DESTINATION>[,<DESTINATION>]*
                        |table <IDENTIFIER>   = (<DESTINATION>,<PERCENT>)
                                                 [,(<DESTINATION>,<PERCENT>)]*
                        |telnr <IDENTIFIER>   = <DESTINATION>[,<DESTINATION>]*
                        |time <IDENTIFIER>    = <HOUR>:<MINUTE>
                                                 [,<HOUR>:<MINUTE>]
                        |var <IDENTIFIER>     = <DIGIT>* | '<ALPANUMERIC>'
                                                |<NULL>

DISTRIBUTE              ::= ALLOCATE <table IDENTIFIER>

END LOGICAL BLOCK       ::= END

FIND                    ::= READ <FILE NAME>,<KEY>,<data IDENTIFIER>

LOCATE                  ::= INDEX (<var | data IDENTIFIER> | <CONSTANT>,
                                   telnr | var IDENTIFIER>[<INDEX>])

PRECEDENCE RULE         ::= SELECT (<acd|agent|ip IDENTIFIER>
                                   [,<acd|agent|ip IDENTIFIER>]
                                   [,<acd|agent|ip IDENTIFIER>]),
                                   <METHOD>,{[<TREATMENT> | <REJECTCD> |
                                   default]}

SEND                    ::= ROUTE <DESTINATION> | <REJECTCD> | default |
                                  <telnr IDENTIFIER>[<INDEX>]

START LOGICAL BLOCK     ::= BEGIN
```

Language Statements

Language Statements define how the features can be combined to perform a specific task. In addition the statements define the sequence that the features are to be invoked for the processing of a given routing request.

```
CONDITIONAL STATEMENT   ::= if (<LOGICAL EXPRESSION>) then
                                   <UNCONDITIONAL STATEMENT>
                                   |<PARAGRAPH>
                              | if (<LOGICAL EXPRESSION>) then
                                   <UNCONDITIONAL STATEMENT>
                                   |<PARAGRAPH> else
                                   <UNCONDITIONAL STATEMENT>
PARAGRAPH               ::= <START LOGICAL BLOCK>
                                <STATEMENT>*
                                <END LOGICAL BLOCK>
PROGRAM                 ::= <DECLARATION>*
                                <PARAGRAPH>
STATEMENT               ::= <UNCONDITIONAL STATEMENT>
                            |<CONDITIONAL STATEMENT>
                            |<START LOGICAL BLOCK>
                                [<UNCONDITIONAL STATEMENT>
                                |<CONDITIONAL STATEMENT>]*
                            <END LOGICAL BLOCK>
UNCONDITIONAL STATEMENT ::= <ASSIGNMENT>;
                            |<CALL TREATMENT>;
                            |<COMMENTS>
                            |<DECLARATION>;
                            |<DISTRIBUTE>;
                            |<END LOGICAL BLOCK>;
                            |<FIND>;
                            |<LOCATE>
                            |<PRECEDENCE RULE>;
                            |<SEND>;
                            |<START LOGICAL BLOCK>;
```

Input/Output Data Area

The following is the format of the route request message processed by the CAMEL Decision Tree. These are considered to be CAMEL Reserve Words.

```
<INQUIRY_MSG>          ::= INVOKE_MSG =
                            ANI              (1,10),
                              ANI_NPACO      (1,6),
                              ANI_NPA        (1,3),
                              ANI_CO         (4,3),
                              ANI_STAT       (7,4),
                            DIALED_NR        (11,10),
                              DIALED_NPACO   (11,6),
                              DIALED_NPA     (11,3),
                              DIALED_CO      (14,3),
                              DIALED_STAT    (17,4),
                            X25LABEL         (21,8)'
                            NUI              (29,16),
                            UUI              (45,16),
                            INQ_ID           (61,10),
                            SL_CODE_TYPE     (71,1),
                            SELECT_CODE      (72,10),
                            RECORD_TYPE      (82,2),
                            NUMBER_SITE      (84,1),
                            UNUSED           (85,1),
                            SITE_TABLE       (86,80),
                              SITE_NUMBER    (86,2),
                              SITE_PERCENT   (88,2);
```

EXAMPLE FROM AT&T RCS MANUAL
(FIGURE 2-14)

"AREA CODE DEFINITIONS"

```
AC CA       = 418,...;
AC CANADA   = 403,...;
AC GA       = 404,912;
AC NJ       = 201,609;
AC SOUTH    = 512,409,...;
AC WEST     = 619,714,...;
```

"WORK DAY"

```
TIME WORKDAY = 08:00,17:00;
```

"DESTINATIONS"

```
TELNR S0100   = 7080707;
TELNR S0200   = 7082408000;
TELNR S0300   = 8003663000;
TELNR S0400   = 7770012;
TELNR S0500   = 7890023;
TELNR S0600   = 7459990;
TELNR S0700   = 7457803;

BEGIN;
IF SDAYWEEK EQ WEEKEND THEN RECORDING '303';
IF STIME NE WORKDAY THEN
  BEGIN;
    IF ANI_NPA EQ CANADA THEN ROUTE S0300;
    IF ANI_NPA EQ NJ THEN ROUTE S0100;
    ROUTE S0200;
  END;
IF ANI_NPA EQ WEST THEN
  BEGIN;
    IF ANI_NPA EQ CA
      THEN ROUTE S0700
      ELSE ROUTE S0600;
  END;
IF ANI_NPA EQ SOUTH THEN
  BEGIN;
    IF ANI_NPA EQ GA
      THEN ROUTE S0500
      ELSE ROUTE S0400;
  END;
END;
```

TELECATALOGUE EXAMPLE #1

```
AC ROANPA        = 215,301,...;
AC SANNPA        = 214,301,...;
TELNR ERRMSG     = 8003335555;
TELNR ROAGATE    = 'ROANOKE';
TELNR SANGATE    = 'SAN_ANTONIO';
TELNR SANSITE    = 7341003;
TIME WORKDAY     = 06:15,20:45;

BEGIN;
IF ANI_NPA EQ SANNPA THEN ROUTE SANGATE;
IF ANI_NPA EQ ROANPA THEN
 BEGIN;
  IF STIME NE WORKDAY THEN ROUTE SANSITE;
  ROUTE ROAGATE;
 END;
RECORDING ERRMSG;
END;
```

TELECATALOGUE EXAMPLE #2

```
AC ROANPA        = 215,301,...;
AC SANNPA        = 214,301,...;

TABLE SANALLOC   = ('SAN_ANTONIO',80),
                   ('FT_WAYNE',10),
                   ('MOBILE',10);

TELNR ERRMSG     = 8003335555;
TELNR ROASITE    = 'ROANOKE';
TELNR SANSITE    = 'SAN_ANTONIO';

TIME WORKDAY     = 06:15,20:45;

BEGIN;
IF ANI_NPA EQ SANNPA THEN ALLOCATE SANALLOC;
IF ANI_NPA EQ ROANPA THEN
 BEGIN;
   IF STIME NE WORKDAY THEN ROUTE SANSITE;
   ROUTE ROASITE;
 END;
RECORDING ERRMSG;
END;
```

TELECATALOGUE EXAMPLE #3

```
ACD TELECAT    = 'SAN_ANTONIO',              "Telecatalogue Resource Table"
                 'GREENSBORO',
                 'WICHITA',
                 'FT_WAYNE',
                 'MOBILE';

IP ARUSITES    = 'KCKSARU',                  "Kansas City Overflow ARU"
                 'CHCARU';                   "Chicago Overflow ARU"

TABLE TELENDAY = ('SAN_ANTONIO',33),         "Telecatalogue Nonwork Day Table"
                 ('GREENSBORO',34),
                 ('WICHITA',33);

TELNR ERRMSG   = 8003335555;                 "Error Recording Destination"

TIME WORKDAY   = 06:15,20:45;                "Roanoke Work Hours"

BEGIN;
IF STIME EQ WORKDAY THEN
  SELECT (TELECAT,ARUSITES),BALANCE,ERRMSG;
ALLOCATE TELENDAY;
END;
```

ANI VERIFICATION EXAMPLE

```
DATA AREA     = '';

TABLE IPF     = ('COLIPF',33),
                ('DALIPF',34),
                ('SCHIPF',33);

TELCO ERRMSG  = 7658890;

VAR ANIKEY    = 10'';
VAR ANIFILE   = 'ANIFILE';

BEGIN;
ANIKEY = ANI;
READ ANIFILE,ANIKEY,AREA;
IF RT_CODE NE ZERO THEN
  BEGIN;
    RT_CODE = ZERO;
    ROUTE ERRMSG;
  END;
ALLOCATE IPF;
END;
```

LANGUAGE SUPPORT EXAMPLE

```
ACD GRENSITE      = 7890032;
ACD SANSITE       = 7832113,
                    7965033;

DATA RECORD       = TELENUM(1,10),
                    LANGUAGE(11,1),
                    NAME(15,40);

TELNR ERRMSG      = 7440000;

VAR ANIKEY        = 10'';
VAR ANIFILE       = 'ANIFILE';

BEGIN;
ANIKEY = ANI;
                "Read Customer Telephone File";
READ ANIFILE,ANIKEY,RECORD;
IF RT_CODE NE ZERO THEN
  BEGIN;
    RT_CODE = ZERO;
    ROUTE ERRMSG;
  END;
                "Check If Customer Speaks Spanish";
                "If Yes Route to San Antonio or Ft. Wayne";
                "Else Route to Greensboro";
IF LANGUAGE EQ 'S' THEN SELECT (SANSITE),BALANCE,ERRMSG;
ROUTE GRENSITE;
END
```

LOCATER EXAMPLE

```
AC    TABLE1 = 201,213,215,312,313,407,507,....;
TELNR TABLE3 = 'SAN_ANTONIO','MOBILE';
VAR   INDEX1 = 0;
VAR   TABLE2 = 1,1,1,2,2,1,2....;

BEGIN;
  INDEX1 = INDEX(ANI_NPA,TABLE1);
  INDEX1 = TABLE2(INDEX1);
  ROUTE TABLE3(INDEX1);
END;
```

Symbol Table

All CAMEL Declarations, System Functions, System Identifiers, certain Reserve Words, Input/Output Areas, constants and internal CAMEL labels are placed into this table. The Symbol Table, Table 1, is constructed during the parsing phase of the CAMEL compiler. The Symbol Table is created as a push-up stack. As each CAMEL Declaration is encountered in the source statements a search is performed to determine if the Identifier has previously been declared. If it has, the current Declaration is flagged as an error. If the Identifier was not previously defined it is inserted into the Symbol Table at the end of the table. If it appropriate to do so the value assigned to the Identifier is placed into the Variable Pool starting with the next available position. The relative location of the value of the Identifier in the Variable Pool is stored into the Symbol Table entry field "Pointer". The "Type", "Class" and "Format" fields in the Symbol Table entry are filled with the appropriate data based upon the given Declaration type and format. The "Number" and "Length" fields refer to the number of subvariables defined by the Declaration and the length of the subvariables. For a given entry, all subvariables are of the same length. If the Declaration defines a character variable with subvariables, the length for all of the subvariables is the length of the longest subvariable. Character values are placed left justified into the subvariable entries. Unused area in each subvariable is padded with character blanks. At the completion of the Declaration Section of the decision tree all of the variables that will be used in the tree will have been defined.

Decision Tree Constants encountered in the Procedure Section will be placed into the Symbol Table as if they had been defined with a Declaration Statement. An internal CAMEL name will be generated and used for the name of the constant. The remainder of the fields in the entry will be filled with the appropriate data based upon the Constant's attributes.

| Entry Format | |
|---|---|
| Symbol Name | 12 Bytes |
| Pointer to Value | 4 Bytes |
| Symbol Type | 1 Byte |
| Symbol Class | 1 Byte |
| Value Format | 1 Byte |
| Number of Values | 1 Byte |
| Length of Value | 2 Bytes |
| Miscellaneous | 6 Bytes |

Table 1

Identifiers used in the Procedure Section of the decision tree will be compared against the entries in the Symbol Table to determine if they have been defined. An Identifier will be flagged if it is not located in the Symbol Table. Identifiers found in the Symbol Table will be use to determine if they have been used in the proper context in the current statement. If the Identifier is found to be used in an improper manner the statement is flagged as an error.

CAMEL System Functions, System Identifiers, certain Reserve Words and Input/Output Area fields are predefined in the Symbol Table. The "Name" field of these entries contains the internal CAMEL name of the specific element. Th following specifications will be used for the predefined system elements in t. Symbol Table.

A. System Functions
        The "Pointer" value is the off-set within the System Function Vector Table. Each entry in the System Function Vector Table contains the actual address of the processor module that interprets the specific command. The "Type" designation for this entry is System Function. These table entries do not use the remainder of the entry's fields. Since these entries reference the System Function Vector Table there are no corresponding entries in the Variable Pool.
        The Process Control System Function is an internal function that controls the statement execution sequence within a Decision Tree.

| System Function | Name | Pointer |
|---|---|---|
| Arithmetic Expression | ARITHMETIC EXPRESSION | x'00000000' |
| Assignment | ASSIGNMENT | x'00000004' |
| Call Treatment | RECORDING | x'00000008' |
| Distribute | ALLOCATE | x'0000000C' |
| Find | READ | x'00000010' |
| If | IF | x'00000014' |
| Logical Expression | LOGICAL EXPRESSION | x'00000018' |
| Precedence Rule | SELECT | x'0000001C' |
| Process Control | n/a | x'00000020' |
| Send | ROUTE | x'00000024' |

B. System Identifiers

The "Pointer" value is the off-set within the System Control Table. Each entry in this table contains the actual system variable. The "Type" designation for these entries is System Identifier. The "Format" type for these elements is binary. All entries are four bytes in length. The remainder of the entry fields are not used for this entry type. Since these entries reference the System Control Table there are no corresponding entries in the Variable Pool.

| Name | Pointer | Comments |
|---|---|---|
| SDATE | x'00000000' | points to the Binary representation of the number of days since January 1, 1991 |
| SDAYWEEK | x'00000004' | points to the Binary representation of day of the week |
| SHOUR | x'00000008' | points to the Binary representation of the number of hours since midnight (00:00hrs) |
| SMINUTE | x'0000000C' | points to the Binary representation on the number of minutes since the beginning of the current hour |
| SMONTH | x'00000010' | points to the Binary representation of the month of the year |
| STIME | x'00000014' | points to the Binary representation of the number of minutes since midnight of the current day |
| SDAYYEAR | x'00000018' | points to the Binary representation of the number of days since the beginning of the current year |

C. Reserve Words

The "Pointer" value is the off-set within the Variable Pool. The "Type" designation for these entries is Reserve Word. The "Class" field is not used for this entry type. The follow are the specifications for the remainder of the fields in the individual Reserve Word Symbol Table entry and the associated Variable Pool entry.

| Name | Format | Number | Length | Value | Comments |
|---|---|---|---|---|---|
| BUSY01 | Character | 1 | 2 | 01 | US Sprint Reject Code 1 |
| BUSY02 | Character | 1 | 2 | 02 | US Sprint Reject Code 2 |
| BUSY03 | Character | 1 | 2 | 03 | US Sprint Reject Code 3 |
| BUSY04 | Character | 1 | 2 | 04 | US Sprint Reject Code 4 |
| CHRISTMAS | Binary | 1 | 2 | 12/25 | represented as the number of days since the beginning of the year |
| FRIDAY | Binary | 1 | 1 | 6 | |
| JULY4TH | Binary | 1 | 2 | 07/04 | represented as the number of days since the beginning of the year |
| MATH_ERR | Binary | 1 | 1 | 0 | |
| MIDNIGHT | Binary | 1 | 2 | 00:00 | represented as the number of minutes since Midnight |

| | | | | | |
|---|---|---|---|---|---|
| MONDAY | Binary | 1 | 1 | 2 | |
| NEWYEAR | Binary | 1 | 2 | 01/01 | represented as the number of days since the beginning of the year |
| NOON | Binary | 1 | 2 | 12:00 | represented as the number of minutes since Midnight |
| ONE | Binary | 1 | 1 | 1 | |
| READ_EOF | Character | 1 | 1 | 0 | |
| READ_ERR | Character | 1 | 1 | 0 | |
| READ_RNF | Character | 1 | 1 | 0 | |
| RT_CODE | Character | 1 | 1 | 0 | |
| SATURDAY | Binary | 1 | 1 | 7 | |
| SUNDAY | Binary | 1 | 1 | 1 | |
| THURSDAY | Binary | 1 | 1 | 5 | |
| TUESDAY | Binary | 1 | 1 | 3 | |
| VOID | Binary | 1 | 1 | null | |
| WEDNESDAY | Binary | 1 | 1 | 4 | |
| WEEKDAY | Binary | 5 | 1 | 2,3,4,5,6 | |
| WEEKEND | Binary | 2 | 1 | 1,7 | |
| ZERO | Binary | 1 | 2 | 0 | |

The following are Self Defining Reserve Words. These objects have Symbol Table entries just like Reserve Words but they do not have an associated Variable Pool entry. These objects are defined by the Symbol Table Entry "Name" and "Type" fields.

Symbol Name

+
-
*
/
lt
gt
eq
ne
ge
le
balance
default
nearest

D. System Input/Output Area

The "Pointer" value is the off-set within the Variable Pool for the defined field. The "Type" designation for these entries is Input/Output Data Area. The "Class" type for the entry that defines the actual input/output area is BUFFER IDENTIFIER. The "Class" type for all other entries is DATA IDENTIFIER. The "FORMAT" classification for all of the elements in this group is character with the exception of the INQ_ID entry. The "FORMAT" classification for this entry is binary. The follow table defines the length attributes for the INVOKE_MSG IDENTIFIER and associated subfields.

| Name | Length |
|---|---|
| INVOKE_MSG | 165 |
| ANI | 10 |
| ANI_NPACO | 6 |
| ANI_NPA | 3 |
| ANI_CO | 3 |
| ANI_STAT | 4 |
| DIALED_NR | 10 |
| DIALED_NPACO | 6 |
| DIALED_NPA | 3 |
| DIALED_CO | 3 |
| DIALED_STAT | 4 |
| X25LABEL | 8 |
| NUI | 16 |
| UUI | 16 |
| INQ_ID | 10 |
| SL_CODE_TYPE | 1 |
| SELECT_CD | 10 |
| RECORD_TYPE | 1 |
| COMP_CODE | 1 |
| NUMBER_SITE | 2 |
| SITE_TABLE | 80 |
| SITE_NUMBER | 2 |
| SITE_PERCENT | 2 |

E. Input/Output Areas
The "Pointer" value is the off-set within the Variable Pool for the defined field. The "Type" designation for these entries is Input/Output Data Area. The "Class" type for the entry that define the actual input/output area is BUFFER IDENTIFIER. The value of th BUFFER IDENTIFIER "Length" field is calculated from the the "Position" and "Length" for the DATA IDENTIFIER that defines the largest buffer area. The "Class" type for all other entries, subfields, is DATA IDENTIFIER. The "FORMAT" classification for al of the elements in this group is character. The value of the "Leng: field is determine by the defined lengths of the individual subfie: length.

Symbol Table Field Definitions

Field Name: Name
Length: 12 Bytes
Format: Character
Comments: This field contains the Identifier Name, Internal CAMEL Name of a Constant, Internal CAMEL Label, System Function Name, System Identifier name or the name of Input/Output area field.

Field Name: Pointer
Length: 4 Bytes
Format: Binary
Comments: The relative offset from the base address of the given area Field Name: Type
Length: 1 Byte
Format: Binary
Comment: The following are the values that are valid for this field

| Value | Definition |
|---|---|
| x'01' | Entry defines a Declaration |
| x'02' | Entry defines a System Identifier |
| x'03' | Entry defines a System Function |
| x'04' | Entry Defines the Input/Output data area |
| x'08' | Entry defines a Constant |
| x'10' | Entry defines an internal Label |
| x'11' | Entry defines an Indirect Address |
| x'1C' | Entry defines a Reserve Word |
| x'1E' | Entry defines a Self Defining Reserve Word |

Field Name: Class
Length: 1 Byte
Format: Binary
Comment: The following are the values that are valid for this field when the Class field is defined as a 'Declaration'.

| Value | Definition |
|---|---|
| x'01' | AC Identifier |
| x'02' | ACCO Identifier |
| x'03' | ACD Identifier |
| x'04' | AGENT Identifier |
| x'06' | IP Identifier |
| x'07' | TABLE Identifier |
| x'08' | TELNR Identifier |
| x'09' | TIME Identifier |
| x'0A' | VAR Identifier |
| x'0C' | DATE Identifier |
| x'10' | Variable Pool Entries Not Sorted |
| x'20' | Index Entry |
| x'40' | DATA Identifier |
| x'80' | BUFFER Identifier (Internal Identifier) |

Field Name: Format
Length: 1 Byte
Format: Binary
Comment: The following are the values that are valid for this field

| Value | Definition |
|---|---|
| x'01' | Variable Pool entry pointed to by the "Pointer to Field" is in a character format |
| x'02' | Variable Pool entry pointed to by the "Pointer to Field" is in a binary format |

Field Name: Number
Length: 1 Byte
Format: Binary
Comment: Number of subvariables in the variable Field Name: Length
Length: 2 Bytes
Format: Integer
Comment: This field contains the length of the individual variable or subvariables Field Name: Miscellaneous
Length: 6 Bytes
Format Binary
Comments: Miscellaneous storage area

Variable Pool

All Decision Tree variables are stored in the Variable Pool.

Variable Pool Field Definitions

Field Name: Value
Length: n
Format: As defined in the associated Symbol Table entry
Comment: N/A Field Name: EOV Symbol
Length: 2 Bytes
Format: Binary
Comment: End of Variable symbol x'EFEF'

Procedure Section

The Procedure Section contains one large stack, called the Process Stack, th defines the sequence of execution for the individual statements in the Decis Tree. The stack is composed of four byte entries that point to entries in th Symbol Table. All CAMEL statements except DECLARATION, COMMENTS, and BEGIN ¿ END LOGICAL BLOCK are valid Process Stack statements. The DECLARATION statements define the Decision Tree variables and are created at the time the CAMEL source statements are processed. The COMMENTS statements are discarded the CAMEL compiler and are only used to add commentary to the CAMEL Decision Tree. The START and END LOGICAL BLOCK are used the define the scope of execution. These statements facilitate the generation of the branch-to LABELs for the IF process. The following is the format for each type of CAMEL statement within the Process Stack. The acronym STEP means Symbol Table Entry Pointer.

| CAMEL Statement | Format |
|---|---|
| ASSIGNMENT | 1) STEP for ASSIGNMENT System Function |
| | 2) STEP for the target IDENTIFIER |
| | 3) STEP for source IDENTIFIER |
| | 4) STEP for = |
| | or |
| | 3) STEP for ARITHMETIC EXPRESSION |
| | 4) STEP for MATH_ERR IDENTIFIER System Function |
| | 5) STEP for elements in the expressic in Polish postfix |
| | 6) STEP for = |
| | or |
| | 3) STEP for INDEX System Function |
| | 4) STEP for Argument IDENTIFIER |
| | 5) STEP for Array IDENTIFIER |
| | 6) STEP for = |
| | or |
| | 3) STEP for Index Entry |
| | 4) STEP for source IDENTIFIER |
| | 5) STEP for = |

| | |
|---|---|
| CALL TREATMENT | 1) STEP for RECORDING System Function<br>2) STEP for DESTINATION<br>    or<br>  2) STEP for Index entry<br>  3) STEP for DESTINATION |
| CONDITIONAL STATEMENT | 1) STEP for IF System Function<br>2) STEP for LOGICAL EXPRESSION<br>3) STEP for 1st IDENTIFIER<br>4) STEP for 2nd IDENTIFIER<br>5) STEP for logical operator<br>6) STEP for Internal Label that defines the next instruction to be executed for a false LOGICAL EXPRESSION condition<br>7) STEPs for next statement or statements |
| DISTRIBUTE | 1) STEP for ALLOCATE System Function<br>2) STEP for table IDENTIFIER |
| FIND | 1) STEP for READ System Function<br>2) STEP for RT_CODE Reserve Word<br>3) STEP for FILE NAME IDENTIFIER<br>4) STEP for KEY IDENTIFIER<br>5) STEP for I/O buffer IDENTIFIER |
| PRECEDENCE RULE | 1) STEP for SELECT System Function<br>2) STEP for for SELECT Internal Label<br>3) STEP for 1st IDENTIFIER<br>4) STEP for 2nd IDENTIFIER<br>    or<br>  STEP for VOID Reserve Word<br>5) STEP for 3rd IDENTIFIER<br>    or<br>  STEP for VOID Reserve Word<br>6) STEP for METHOD IDENTIFIER<br>7) STEP for default routing IDENTIFIER |
| SEND | 1) STEP for ROUTE System Function<br>2) STEP for routing IDENTIFIER<br>    or<br>  2) STEP for Index entry<br>  3) STEP for DESTINATION |

Special Editing Rules

1. All dates used in a Decision Tree will be converted to the number of d? since 1 January 1991 and stored as an integer.

2. All times will be converted to the number of minutes since 00:00 hrs and stored as an integer.

3. The maximum length for a COMMENTS statement is 70 positions.

4. The maximum length for an Identifier Name, Internal CAMEL Name of a Constant, Internal CAMEL label, System Function Name, System Identifier Name or the name on an Input/Output area field is 12 positions.

5. The maximum number of user defined symbols is 1000.

6. An ARITHMETIC EXPRESSION may not have more than 5 pairs of parenthesis.

7. The maximum length for a LINK TAG is 12 positions.

8. CONSTANTS:
The maximum length for a CONSTANT defined as character is 20 positions.
The maximum value for a binary CONSTANT is +2,147,483,647.

9. DECLARATION:

| Declaration Type | Maximum Number of Entries |
|---|---|
| ac | 300* |
| acco | 500* |
| acd | 20 |
| agent | 100 |
| data | n/a |
| date | 25* |
| ip | 20 |
| table | 20 |
| telnr | 50* |
| time | 2 |
| var | 100 |

*-The subvariables are sorted in ascending order before being stored in the Variable Pool.

10. DESTINATION verification procedure:
   a.) ACD and IP DECLARATIONS
   Verify that all of the DESTINATIONS have been defined in the Site File. If a DESTINATION is not found in the file the DECLARATION will be flagged as an error. The Site Number located in the Site File for each site used in the DECLARATION will be stored and used to generate the Resource Group Record Key (note - The Resource Group is the collection of Sites defined in either an ACD or IP DECLARATION). After all of the sites have been successfully verified within the Resource Group the collected Site Numbers are sorted in ascending order. All of the Site Numbers are then concatenated together to produce the Resource Group Record Key. This key is 40 positions in length. If the generated key is less then 40 positions it will be stored left justified in the key area and padded with binary zeros to the end of the area.

Using the above generated key read the Resource Group File. If the Resource Group record is found then store the Resource Group Numbe found in the Resource Group record into the Miscellaneous field of the associated Symbol Table Entry for the Resource Group Identifie If the Resource Group Record is not found then generate a Resource Group Number for the Resource Group, build the Resource Group Recc and attempt to insert it into the Resource Group File. New entries inserted into the Resource Group File must adhere to the following rules.
   1) The Resource Group must be unique.
   2) The Resource Group may be a proper subset of an existing Resource Group.
   3) The Resource Group must not intersect with existing Resource Groups.

If the new Resource Group fails the above criteria it is flagged as an error and not inserted into the file. Upon successful insertion of the new record into the file the associated Resource Group Numbe is stored into the Miscellaneous field of the associated Symbol Tab Entry for the Resource Group Identifier.

b.) TELNR and all CONSTANTS used in the context of a Destination
   Verify that the individual Destination has been defined in the Site File. If the Destination is not found in the file the DECLARATION i flagged as an error. If the Site record is found then store the Site Number found in the Site record into the Miscellaneous field of the associated Symbol Table Entry for the destination. Since the declaration and defination of a CONSTANT occurs at the same time the Site verification procedure for this data element will take place during the generation of the Process Stack element that uses the CONSTANT.

c.) TABLE DECLARATION
   Follow the Site verification procedure defined in the section 'b' In addition ensure that the individual percentages do not exceed 100%. The Variable Pool entry for each subvariable will be formatted as follows.

| Position | Format | Comments |
   |---|---|---|
   | 1 - 2 | Binary | Site Number |
   | 3 - 4 | Binary | Allocation Percentage |
   | 5 - 16 | Character | Site Name | d.) SELECT
Concatenate the Resource Group Numbers in the order that they were entered. The Recource Group Numbers are stored in the Miscellaneous field in the Resource Group Identifier Symbol Table Entry. If there are less then three Resource Groups pad the used groups with binary zeros. Append to this string the Site Number for the TREATMENT object. The final string is the key that will be used to access the Outcome File. Read the Outcome File using the generated key. If the Outcome Record is not located then generate an Outcome Number for the Outcome, build the Outcome Record and insert it into the Outcome File using the key generated above. Create an Internal Label Symbol Table Entry and store the Outcome Number into the Miscellaneous area of the entry. This entry does not have a corresponding Variable Pool entry. Place the relative address of the Internal Label in the next location within the Procedure Stack.

Record Layouts:
1) Site Record
   Refer to Activity Monitor Documentation

2) Resource Group Record

| Position | Format | Comments |
|---|---|---|
| 1 - 2 | Binary | Resource Group Number |
| 3 - 4 | Binary | Site Number 1 |
| 5 - 6 | Binary | Site Number 2 |
| * | | |
| * | | |
| 41-42 | Binary | Site Number 20 |

= (Key)

3) Outcome Record

| Position | Format | Comments |
|---|---|---|
| 1 - 4 | Binary | Outcome Number |
| 5 - 6 | Binary | Resource Group Number 1 |
| 7 - 8 | Binary | Resource Group Number 2 |
| 9 -10 | Binary | Resource Group Number 3 |
| 11-12 | Binary | TREATMENT Number |

= (Key)

11. The maximum length for a compiled Decision Tree is 31,500 position.

12. The maximum length for a VAR IDENTIFIER is 512 positions.

13. (blank)

14. The following are the System Function procedures for constructing the INVOKE_MSG area from an ALLOCATE, DEFAULT, REJECT, ROUTE or SELECT statement or object.
    a.) ALLOCATE
        Move a ' ' ,character blank, to the SELECT_CODE_TYPE field. Construct the SITE_TABLE from the Variable Pool information pointed to by the TABLE IDENTIFIER Symbol Table Entry. Move an 'A' to the RECORD_TYPE field. Fill in the NUMBER_SITE field with the number of entries in the SITE_TABLE. The remainder of the fields are unchanged.

b.) DEFAULT
        Move a 'F' to the SELECT_CODE_TYPE field. The remainder of the fields are unchanged.

c.) REJECTCD
        Move a 'R' to the SELECT_CODE_TYPE field. Move the Reject Code pointed to by the REJECTCD Symbol Table Entry to the SELECT_CODE field left justified. The remainder of the fields are unchanged.

d.) ROUTE (and RECORDING)
        Move a ' ' ,character blank, to the SELECT_CODE_TYPE field. Move a 'R' to the RECORD_TYPE field. Move a '01' to the NUMBER_SITE field. Move the Site Number, located in the Miscellaneous field of the associated Symbol Table Entry, to the first SITE_NUMBER entry in the SITE_TABLE. The remainder of the fields are unchanged.

If the object of the ROUTE is DEFAULT or REJECTCD then follow the procedures for DEFAULT and REJECTCD above.

e.) SELECT
  Move a ' ' ,character blank, to the SELECT_CODE_TYPE field. Move
  '01' to the NUMBER_SITE field. Move a 'S' to the RECORD_TYPE fiel
  Move the Outcome Number pointed to by the Internal Label Symbol T
  Entry to the first four positions of the SITE_TABLE. The remainde
  the fields are unchanged.

15. If the second operand of a TIME DECLARATION is less than the first
    operand add 1440 (24 hrs * 60) to the second operand.

16. CAMEL Compiler Error Messages
    The following errors will generate compiler error messages.

Error
    a) Illegal item in a Character String.
    b) COMMENTS statement exceeds 70 positions.
    c) Identifier Name exceeds 12 positions.
    d) Symbol Table exceeds 1000 entries.
    e) Character CONSTANT exceeds 20 positions.
    f) Numeric CONSTANT exceeds the value +2,147,483,647.
    g) Declaration class subvariable exceeds the following number.

| Declaration Type | Maximum Number of Entries |
       |---|---|
       | ac | 300 |
       | acco | 500 |
       | acd | 20 |
       | agent | 100 |
       | data | n/a |
       | date | 25 |
       | ip | 20 |
       | table | 20 |
       | telnr | 50 |
       | time | 2 |
       | var | 100 | h) Compiled Decision Tree is greater than 31,500 positions.
    i) VAR IDENTIFIER exceeds 512 positions.
    j) Unbalanced BEGIN END pairs.
    k) Unbalanced " " pairs.
    l) Statement does not end with a ;.
    m) The sum of the percents in a TABLE Declaration exceeds 100.
    n) Invalid date in a DATE Declaration.
    o) Invalid time in a TIME Declaration.
    p) Invalid use of a Declaration Class.
    q) Undeclared or duplicate Symbol.
    r) FILE NAME greater then eight positions.
    s) LINK TAG greater than 12 position.
    t) SUBSCRIPT values greater than 999.
    u) DATA elements exceed Buffer length.
    v) General syntax error.
    w) Invalid arithmetic operator Decision Tree Initialization
Decision PseudoCode Initialization Initialize all Pointers
    SAIN Activity Table
    IXC Inquiry Message Area
    800 Decision Tree For Current Inquiry Message
    etc.

Locate INVOKE_MSG area in Variable Pool

Move IXC Inquiry Message to INVOKE_MSG area

Locate Process Control System Function address

Pass Control to Process Control System Function

Move INVOKE_MSG area back to IXC Inquiry Message Area

Delay module processing

Process Control System Function
PseudoCode

```
Initialize all Pointers
  Symbol Table
  Variable Pool
  Process Stack
  System Function Vector Table
  System Identifiers
  etc.

Locate 1st Entry in Process Stack
```

Label1   If End of Process Stack Then Return to Calling Routine

```
If Process Stack Entry a System Function
Then
  Increment Stack Pointer to Next Entry
  Pass Control to System Function Return From System Function If Return Pointer is Equal to End of Decision Tree (x'EFEFEFEF')
    Then
       If no Destination statement (ALLOCATE, RECORD, ROUTE or
       SELECT) has been processed Then format the current INVOKE_MSG
       area to indicate DEFAULT call processing for the current call Return to Calling Routine Adjust Stack Pointer Based Upon System Function Return Pointer Go To Label1
```

Sample Decision Tree

```
VAR A = 1;
VAR B = 2;
TELNR ROUTE_#1 = 7013114;
TELNR ROUTE_#2 = 7013115;
BEGIN;
  IF A EQ B THEN ROUTE ROUTE_#1;
  ROUTE ROUTE_#2;
END;
```

Symbol Table

| Entry Number | Type | Pointer |
|---|---|---|
| 6 | IF System Function | x'14' |
| 7 | Logical Expression System Function | x'18' |
| 10 | ROUTE System Function | x'24' |
| 47 | EQ Reserve Word | n/a |
| 67 | A Declaration var Identifier | x'00' |
| 68 | B Declaration var Identifier | x'02' |
| 69 | ROUTE_#1 Declaration telnr Identifier | x'04' |
| 70 | ROUTE_#2 Declaration telnr Identifier | x'0B |
| 71 | #LABEB01 Internal Label | x'30' |

Variable Pool

| Entry Number | Value |
|---|---|
| 1 | x'0001' |
| 2 | x'0002' |
| 3 | 7013114 |
| 4 | 7013115 |

Process Stack

| Entry Number | Symbol Table Entry Number | Process Stack Relative Address |
|---|---|---|
| 1 | 6 | x'00000000' |
| 2 | 7 | x'00000004' |
| 3 | 67 | x'00000008' |
| 4 | 68 | x'0000000C' |
| 5 | 47 | x'00000010' |
| 6 | 71 | x'00000014' |
| 7 | 10 | x'00000018' |
| 8 | 69 | x'0000001C' |
| 9 | x'EFEFEFEF' | x'00000020' |
| 10 | 10 | x'00000024' |
| 11 | 70 | x'00000028' |
| 12 | x'EFEFEFEF' | x'0000002C' |
| | x'EFEFEFEF' | x'00000030' |

We claim:

1. A subscriber call load balancing system for use outside of a carrier public switched telephone network (PSTN) for designating routing of telephone calls to any one of a plurality of different subscriber resources for any subscriber N00 number, comprising:

receive processing means for receiving a routing query from said PSTN for any call placed to the subscriber N00 number, said routing query including call identification information including indicia relating to the call;

means for storing a routing algorithm for selecting one of said subscriber resources to receive a call to the subscriber N00 number, said routing algorithm utilizing call identification information for selecting a routing function, at least one routing function using capacity percentages for balancing call distribution, each such capacity percentage representing a proportion of all calls for a desired resource that can be handled; and routing processing means responsive to a call request from the PSTN for any subscriber N00 number and utilizing said stored routing algorithm for selecting a subscriber resource to handle a call and sending a response to said PSTN designating the selected resource to handle the call.

2. The call load balancing system of claim 1 further comprising means for programming one or more said routing algorithms, each said algorithm using said routing functions to select a resource for receiving a call to the subscriber N00 number, wherein one said routing functions include a route function to route the call to a single specified destination, an allocate function to route the call based on subscriber defined allocation percentages and a select function to route the call using said capacity percentages, and said algorithm is implemented by said routing processing means to use one of said route, allocate and select functions.

3. A subscriber call load balancing system for use outside of a carrier public switched telephone network (PSTN) for designating routing of telephone calls to any one of a plurality of different subscriber resources for a subscriber N00 number, comprising:

event processing means for determining statistical information relating to availability of each said resource for receiving calls during a processing cycle;

outcome processing means for determining statistical information relating to routing of calls during previous processing cycles;

call demand processing means responsive to statistical information obtained from said outcome processing means for predicting desired routing of calls in a next subsequent processing cycle;

load balance processing means responsive to said event processing means and said call demand processing means for calculating capacity percentages for call distribution to said subscriber resources in a next successive processing cycle, each such capacity percentage representing a proportion of all calls for a desired routing that can be handled;

means for storing a routing algorithm for selecting one of said subscriber resources to receive a call to the subscriber N00 number, said routing algorithm utilizing said capacity percentages for balancing call distribution; and routing processing means responsive to a call request from the PSTN for the N00 number and utilizing said routing algorithm for selecting a subscriber resource to handle a call using said capacity percentages and sending a response to said PSTN designating the selected resource to handle the call.

4. The call load balancing system of claim 3 further comprising means for programming one or more said routing algorithms, each said algorithm comprising logic steps used to select a resource for receiving a call to the subscriber, wherein one said logic step includes selecting one of said resources in order to route the call using said capacity percentages.

5. The call load balancing system of claim 4 wherein said programming means may assign any said resource to more than one routing algorithm.

6. The call load balancing system of claim 5 wherein said programming means assigns each and every subscriber N00 phone number to a routing algorithm, wherein any said algorithm can be simultaneously assigned to more than one N00 phone number.

7. The call load balancing system of claim 3 wherein said communication means is operatively coupled to a database for storing call routing information for known customers and a request to route a call includes an identification of the caller and further comprising means for comparing the caller identification to known customers having information stored in said database to determine if said caller is a known caller, and if said caller is a known caller, then transmitting said routing information for the known caller with the designation of the resource to receive the call.

8. The call load balancing system of claim 3 further comprising means for programming one or more said routing algorithms, each said algorithm comprising logic steps used to select a resource for receiving a call to the subscriber N00 number, wherein one said logic step include a route function to route the call to a single specified destination, an allocate function to route the call based on subscriber defined allocation percentages and a select function to route the call using said capacity percentages, and said algorithm is implemented by said routing processing means to use one of said route, allocate and select functions.

9. In a telephone network system for routing telephone calls to any one of a plurality of different subscriber resources for a subscriber N00 number, including a service control point (SCP) having a processor utilizing routing trees for selecting one such resource, an improved call load balancing system comprising:
event processing means for determining statistical information relating to availability of each said resource for receiving calls;
routing processing means for determining statistical information relating to routing of calls during previous processing cycles;
call demand processing means responsive to statistical information obtained from said routing processing means for predicting desired routing of calls in a next subsequent processing cycle;
load balance processing means responsive to said event processing means and said call demand processing means for calculating capacity percentages for call distribution to said subscriber resources in a next successive processing cycle, each such capacity percentage representing a proportion of all calls for a desired routing that can be handled; and
communication means operatively coupled to said SCP and responsive to a call request from the SCP for sending a response to said SCP designating a call resource to handle the call in accordance with said capacity percentages.

10. The call load balancing system of claim 9 further comprising means for programming one or more routing algorithms used by said communication means for designating a call resource, each said algorithm comprising logic steps used to select a resource for receiving a call to the subscriber, wherein one said logic step includes selecting one of said resources in order to route the call using said capacity percentages.

11. The call load balancing system of claim 10 wherein said programming means may assign any said resource to more than one routing algorithm.

12. The call load balancing system of claim 10 wherein said programming means assigns each and every subscriber N00 phone number to a routing algorithm, wherein any said algorithm can be simultaneously assigned to more than one N00 phone number.

13. The call load balancing system of claim 9 wherein said communication means is operatively coupled to a database for storing call routing information for known customers and a request to route a call includes an identification of the caller and further comprising means for comparing the caller identification to known customers having information stored in said database to determine if said caller is a known caller, and if said caller is a known caller, then transmitting said routing information for the known caller with the designation of the resource to receive the call.

14. A method of designating routing of telephone calls to a plurality of different subscriber resources to provide a desired load balancing among said resources in a subscriber network system having a processor utilizing routing algorithms for selecting one such resource, comprising the steps of:
defining at least one routing outcome comprising a plurality of said subscriber resources organized into a plurality of groups, each said group having a distinct precedence level relative to the other groups;
periodically performing a processing cycle to designate load balancing among resources in any said routing outcome, including
receiving resource statistical information from said resources relating to availability of each said resource for receiving calls,
collecting outcome statistical information relating to routing of calls to any said routing outcome during previous processing cycles,
predicting desired routing Of calls in a next subsequent processing cycle using said outcome statistical information,
calculating capacity percentages for call distribution to said subscriber resources for each said routing outcome in a next successive processing cycle using said resource statistical information and said predicted desired routing of calls, including calculating such capacity percentages initially for the highest precedence level group and then for successively lower precedence level groups until all predicted calls have been distributed, each such capacity percentage representing a proportion of all calls for a desired routing outcome that can be handled, and
transferring said capacity percentages to be used in said processor algorithm; and
in response to a request for routing a phone call, designating a call resource to receive said call using said capacity percentages.

15. The method of claim 14 further comprising the step of defining one or more of said routing algorithms, each said algorithm comprising logic steps used to select a resource for receiving a call to the subscriber, wherein one said logic step includes selecting one of said routing outcomes in order to route the call using said allocation percentages.

16. The method of claim 15 wherein said routing algorithm defining step may include assigning any said routing outcome to more than one routing algorithm.

17. The method of claim 15 further comprising the step of assigning each and every subscriber N00 phone number to a routing algorithm, wherein any said algorithm can be simultaneously assigned to more than one N00 phone number.

18. The method of claim 14 further comprising a receiving step receiving a request to route a call and in response thereto implementing said routing algorithm to designate a resource to receive said call.

19. The method of claim 18 wherein said processor is operatively coupled to a database for storing call routing information for known customers and a request to route a call includes an identification of the caller and further comprising the step of comparing the caller identification to known customers having information stored in said database to determine if said caller is a known caller, and if said caller is a known caller, then transmitting said routing information for the known caller with the designation of the resource to receive the call.

20. The method of claim 14 wherein said method is operable to receive requests from a plurality of different telephone carrier networks and said designating step comprises designating the calling resource independent of the particular carrier network generating the request.

21. The method of claim 14 wherein said transferring step is implemented at the end of each processing cycle and said designating step uses the transferred capacity percentages until the end of a subsequent processing cycle.

* * * * *